(12) United States Patent
Kwon

(10) Patent No.: US 9,378,635 B2
(45) Date of Patent: Jun. 28, 2016

(54) MOBILE TERMINAL

(71) Applicant: LG ELECTRONICS INC., Seoul (KR)

(72) Inventor: Hyuntaek Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 397 days.

(21) Appl. No.: 13/944,533

(22) Filed: Jul. 17, 2013

(65) Prior Publication Data

US 2014/0022369 A1 Jan. 23, 2014

(30) Foreign Application Priority Data

Jul. 17, 2012 (KR) ........................ 10-2012-0077595

(51) Int. Cl.
*G08B 21/02* (2006.01)
*H04M 1/725* (2006.01)

(52) U.S. Cl.
CPC ............ *G08B 21/02* (2013.01); *H04M 1/72522* (2013.01); *H04M 1/72536* (2013.01); *H04M 2250/22* (2013.01); *H04M 2250/52* (2013.01)

(58) Field of Classification Search
CPC ............. G08B 21/02; H04M 1/72522; H04M 1/72536; H04M 2250/22; H04M 2250/52
See application file for complete search history.

(56) References Cited

U.S. PATENT DOCUMENTS

| | | | | |
|---|---|---|---|---|
| 8,447,070 B1 * | 5/2013 | Bozarth | ................... | H04N 7/18 382/103 |
| 2003/0076421 A1 * | 4/2003 | Dutta | ................. | H04N 5/23248 348/208.11 |
| 2005/0083642 A1 * | 4/2005 | Senpuku | ................ | G06F 1/1616 361/679.21 |
| 2007/0232336 A1 * | 10/2007 | Kim | ....................... | G06F 1/1626 455/466 |
| 2008/0090537 A1 * | 4/2008 | Sutardja | ................ | G06F 1/3203 455/232.1 |
| 2009/0184244 A1 * | 7/2009 | Drews | ...................... | A62B 3/00 250/330 |
| 2009/0278932 A1 * | 11/2009 | Yi | .......................... | H04N 7/185 348/147 |
| 2010/0185390 A1 * | 7/2010 | Monde | .................... | G01C 21/26 701/532 |
| 2010/0304788 A1 * | 12/2010 | Mun | ................. | H04M 1/72572 455/556.1 |
| 2011/0092248 A1 * | 4/2011 | Evanitsky | ........ | G08B 13/19621 455/556.1 |
| 2011/0106487 A1 * | 5/2011 | Kourogi | .................. | G01C 21/26 702/142 |
| 2011/0194230 A1 * | 8/2011 | Hart | ...................... | H04M 1/185 361/437 |
| 2012/0026088 A1 * | 2/2012 | Goran | ................... | G06F 1/1639 345/158 |
| 2012/0032806 A1 * | 2/2012 | Lee | .......................... | G08B 23/00 340/573.1 |
| 2012/0062729 A1 * | 3/2012 | Hart | ...................... | G06F 1/1626 348/135 |
| 2012/0062743 A1 * | 3/2012 | Lynam | ................... | B60Q 9/005 348/148 |
| 2012/0172085 A1 * | 7/2012 | Vuppu | .................. | G06F 1/3231 455/556.1 |

* cited by examiner

Primary Examiner — Sath V Perungavoor
Assistant Examiner — Peter D Le
(74) Attorney, Agent, or Firm — Birch, Stewart, Kolasch & Birch, LLP

(57) ABSTRACT

A mobile terminal is disclosed. The mobile terminal may display, on a display unit, a captured front side image together with an execution screen of an application in execution, may analyze the captured front side image, and if a front side dangerous situation is sensed, may change a display state of the display unit to thereby send a warning message to the user.

20 Claims, 27 Drawing Sheets

FIG. 14
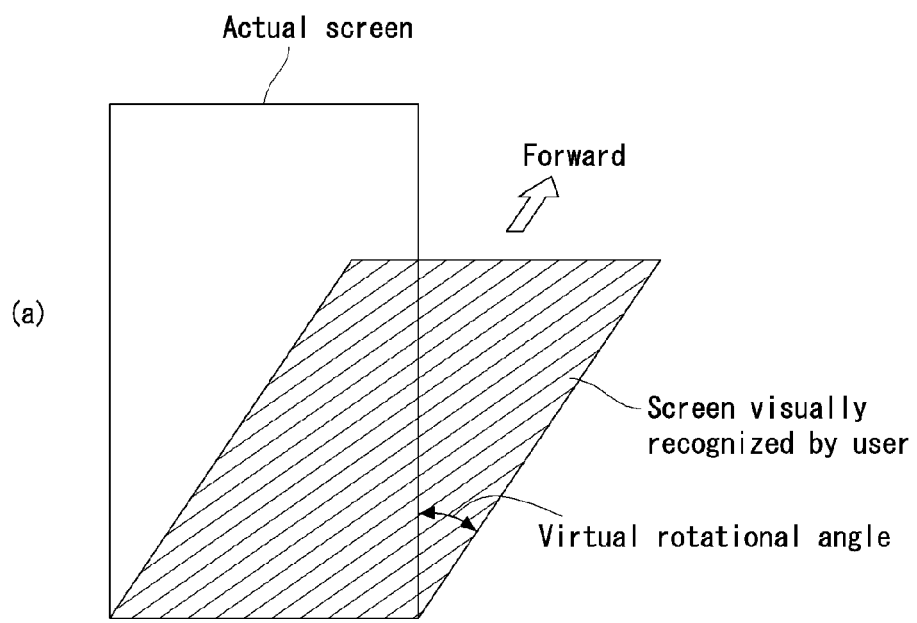
(a)
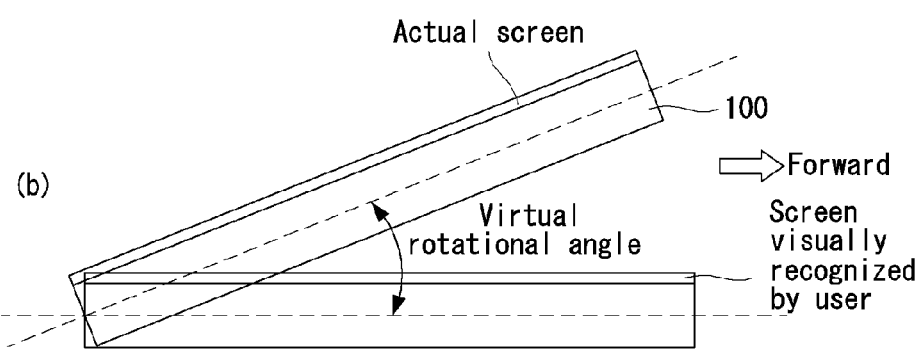
(b)

Normal                Standing angle < threshold angle

FIG. 22
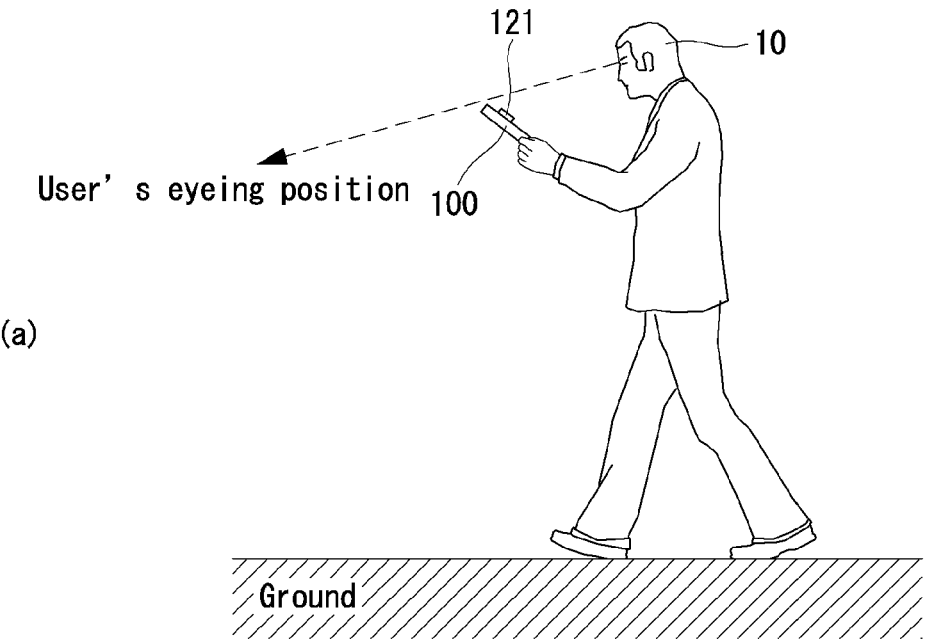
(a)
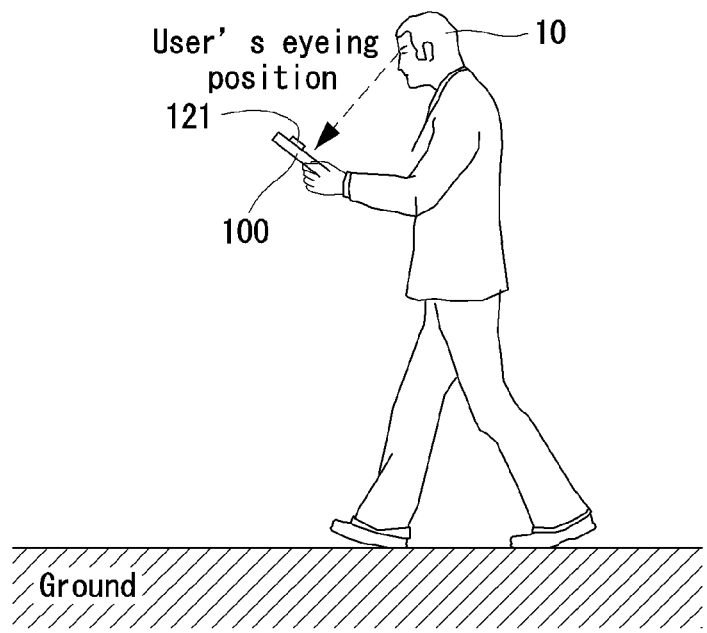
(b)

MOBILE TERMINAL

CROSS-REFERENCE TO RELATED APPLICATION

This application claims the priority benefit of Korean Patent Application No. 10-2012-0077595 filed on 17 Jul., 2012, which is incorporated herein by reference for all purposes as if fully set forth herein.

BACKGROUND

1. Field

The present invention relates to a mobile terminal, and more specifically, to a technology that may capture an image of a front side when a user uses a mobile terminal while on the road, may provide the captured image to the user, and may analyze the captured front side image, thus detecting any dangerous situation at the front side and alerting the user.

2. Related Art

With their diversified functions, personal computers, laptop computers, mobile phones, smartphones, or other terminals serve as multimedia players that may perform multiple functions, such as still or motion image capturing, replay of music or movie files, game playing, or broadcast reception.

It may be considered to make better the structural parts and/or software parts of the terminal in order to support and increase the functions of the terminal. Recently, a number of terminals including mobile terminals have more complicated menus to provide various functions.

More and more users use their mobile terminals on the go, which may lead to a higher chance of negligent accident.

SUMMARY

An object of the present invention is to provide a mobile terminal that may reduce the likelihood of a negligent accident occurring to a user who is on the go while watching the screen of an application in execution by capturing a front side image and displaying the captured image on the display unit.

Another object of the present invention is to provide a mobile terminal that may analyze a front side image captured when a user takes walk to thereby detect any dangerous situation at the front side and alert the user to the dangerous situation.

The objects of the present invention are not limited thereto, and other objects may be apparently understood by those skilled in the art from the detailed description.

To achieve the above objects, a mobile terminal according to an embodiment of the present invention may include a sensing means configured to sense a user walking, a rear camera configured to capture a front side image while the user is walking, an output unit including a display unit, wherein the display unit is configured to display the captured front side image together with an execution screen of an application in execution, and a controller configured to analyze the captured front side image, to change a display state of a screen of the display unit when a front side dangerous situation is sensed, and to send a warning message to the user.

To achieve the above objects, a mobile terminal according to another embodiment of the present invention may include a sensing means configured to sense a user walking, an input unit including a rear camera configured to capture a front side image while the user is walking, an output unit including a display unit configured to display an execution screen of an application in execution, and a controller configured to analyze the captured front side image to sense a front side dangerous situation, to determine a degree of danger of the sensed front side dangerous situation, and to control at least one of an execution state of the application in execution, an activation state of the input unit, and an activation state of the output unit if the degree of danger of the sensed front side dangerous situation is higher than a predetermined level, to thereby send a warning message to the user.

The mobile terminal according to the present invention may primarily reduce possibility of a negligent accident occurring to a user that is on the move while watching the screen of an application in execution by capturing an image of a front side while the user takes walk and displaying the captured image on the display unit.

The mobile terminal according to the present invention may secondarily reduce possibility of a negligent accident occurring to the user that is on the go while watching the application execution screen by analyzing the captured front side image to thereby detect any dangerous situation and alerting him.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 14 is a view illustrating an example where the displayed screen is displayed to be viewed as being inclined according to the danger sensing and alarming method illustrated in FIG. 13;

FIG. 22 illustrates an example where the mobile terminal according to the present invention analyzes a user's image captured through the front camera and determines the user's eyeing position according to the danger sensing and alarming method illustrated in FIG. 21;

DESCRIPTION OF THE EMBODIMENTS

Figure 1:
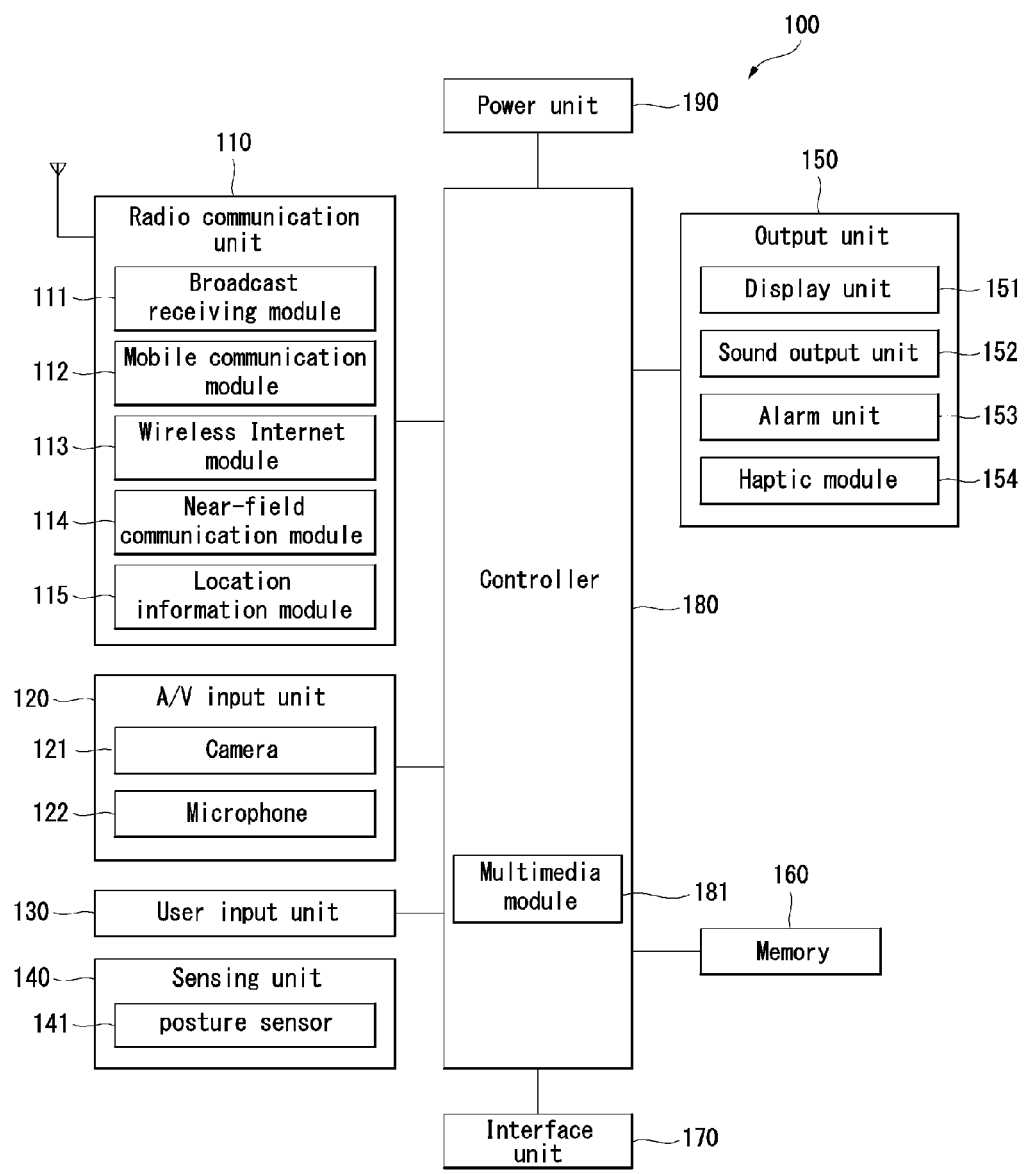
FIG. 1 is a block diagram illustrating a mobile terminal according to an embodiment of the present invention.

To fully understand the advantages of operations of the present invention and objects achieved by the present invention, it needs to refer to the accompanying drawings illustrating the preferred embodiments of the present invention and what is described in the drawings.

In this specification, when one component 'transmits' or 'transfers' data or signals to another component, the component may transmit or transfer the data or signals to the other component directly or via at least one other component. Further, the suffixes "module" and "unit" that come after the components to be described below are provided or mixed up only for ease of description, and accordingly, should not be construed as providing distinguished meanings or functions.

The foregoing or other objects, features, and advantages will be more apparent from the detailed description taken in conjunction with the accompanying drawings. Hereinafter, preferred embodiments of the present invention will be described in detail with reference to the accompanying drawings. The same reference numerals are used to denote the same components throughout the specification. When determined to make the gist of the present invention unnecessarily unclear, the detailed description of the known functions or configurations is skipped.

As used herein, the mobile terminal may include a mobile phone, a smartphone, a laptop computer, a digital broadcast terminal, a PDA (Personal Digital Assistant), a PMP (Portable Multimedia Player), a navigation system, and a dedicated terminal. However, the present invention is not limited thereto.

FIG. 1 is a block diagram illustrating a mobile terminal 100 according to an embodiment of the present invention. Referring to FIG. 1, the mobile terminal 100 may include a radio communication unit 110, an A/V (Audio/Video) input unit 120, a user input unit 130, a sensing unit 140, an output unit 150, a memory 160, an interface unit 170, a controller 180, and a power unit 190. The components of the mobile terminal 100 shown in FIG. 1 are not necessary and so the mobile terminal 100 may include more or less components.

Hereinafter, the components are described one by one.

The radio communication unit 110 may include one or more modules that enable radio communication between the mobile terminal 100 and a radio communication system or between the mobile terminal 100 and a network where the mobile terminal 100 is positioned. For example, the radio communication unit 110 may include a broadcast receiving module 111, a mobile communication module 112, a wireless Internet module 113, a near-field communication module 114, and a location information module 115.

The broadcast receiving module 111 receives a broadcast signal and/or broadcast-related information from an external broadcast management server through a broadcast channel.

The broadcast channel may include a satellite channel or a terrestrial channel. The broadcast management server may mean a server that generates a broadcast signal and/or broadcast-related information or a server that receives a pre-generated broadcast signal and/or broadcast-related information and transmits it to the terminal. The broadcast signal may include not only a TV broadcast signal, a radio broadcast signal, a data broadcast signal but also a broadcast signal obtained by combining a TV broadcast signal or radio broadcast signal with a data broadcast signal.

The broadcast-related information may mean information relating to a broadcast channel, a broadcast program, or a broadcast service provider. The broadcast-related information may be also provided through a mobile communication network. In such case, the broadcast-related information may be received by the mobile communication module 112.

The broadcast-related information may be provided in various forms. For example, the broadcast-related information may be provided in the form of an EPG (Electronic Program Guide) of DMB (Digital Multimedia Broadcasting) or an ESG (Electronic Service Guide) of DVB-H (Digital Video Broadcast-Handheld).

The broadcast receiving module 111 receives a broadcast signal by using various broadcast systems. In particular, the broadcast receiving module 111 receives a digital broadcast signal by using a digital broadcast system, such as DMB-T (Digital Multimedia Broadcasting-Terrestrial), DMB-S (Digital Multimedia Broadcasting-Satellite), MediaFLO (Media Forward Link Only), DVB-H (Digital Video Broadcast-Handheld), ISDB-T (Integrated Services Digital Broadcast-Terrestrial). Of course, the broadcast receiving module 111 may be also configured to fit for other broadcast systems that provide a broadcast signal as well as the above-described digital broadcast system.

The broadcast signal and/or broadcast-related information received through the broadcast receiving module 111 may be stored in the memory 160.

The mobile communication module 112 transmits and receives a wireless signal to/from at least one of a base station, an external terminal, and a server over a mobile communication network. The wireless signal may include a voice call signal, a video call signal, or various types of data according to text/multimedia message transmission/reception.

The wireless Internet module 113 refers to a module for wireless Internet access, and the wireless Internet module 113 may be positioned in or outside the mobile terminal 100. Wireless Internet technologies may be used, such as WLAN (Wireless LAN) (Wi-Fi), Wibro (Wireless broadband), Wimax (World Interoperability for Microwave Access), HSDPA (High Speed Downlink Packet Access), or LTE (Long Term Evolution).

The near-field communication module 114 refers to a module for near-field communication. Near-field communication technologies may be used, such as Bluetooth, RFID (Radio Frequency Identification), IrDA (Infrared Data Association), UWB (Ultra Wideband), or ZigBee.

The location information module 115 is a module to verify or obtain the position of the mobile terminal. The location information module 115 may obtain location information by using the GNSS (Global Navigation Satellite System). Here, the GNSS is a term used to describe wireless navigation satellite systems that send reference signals that allow some types of wireless navigation receivers revolving around the earth to determine their positions. The GNSS includes GPS (Global Position System) operated by the U.S., Galileo operated in Europe, GLONASS (Global Orbiting Navigational Satellite System) operated in Russia, COMPASS operated in China, and QZSS (Quasi-Zenith Satellite System) operated in Japan.

As a representative example of the GNSS, the location information module 115 may be a GPS (Global Position System) module. The GPS module may produce three-dimensional location information of one position (object) according to latitude, longitude, and altitude at a time by measuring information on distances from the position (object) to three or more satellites and information on the time that the distance information is measured and applying trigonometry to the measured distance information. Further, a method is also used that measures location and time information using three satellites and corrects errors on the measured location and time information by using one more satellite. The GPS module also continues to measure the current position in real time and produces speed information based on the measured position.

Referring to FIG. 1, the A/V (Audio/Video) input unit 120 is provided to input an audio signal or video signal, and may include a camera 121 and a microphone 122. The camera 121 processes an image frame, such as a still image or motion image, which is obtained by an image sensor in a video call mode or image capturing mode. The processed image frame may be displayed on a display unit 151.

The image frame processed by the camera 121 may be stored in the memory 160 or may be transmitted to the outside via the radio communication unit 110. Two or more cameras 121 may be provided depending on the configuration of the terminal.

The microphone 122 receives an external sound signal by a microphone in a call mode or recording mode or in a voice recognition mode and processes the received sound signal into electrical voice data. In the case of the call mode, the processed voice data is converted into a form that may be transmitted through the mobile communication module 112 to a mobile communication base station and may be output. The microphone 122 may have various algorithms to remove noise that is created while receiving external sound signals.

The user input unit 130 generates input data for a user controlling the operation of the terminal. The user input unit 130 may be configured as a keypad dome switch, a touchpad (capacitive/resistive), a jog wheel, or a jog switch.

The sensing unit 140 generates a sensing signal for controlling the operation of the mobile terminal 100 by sensing a current state of the mobile terminal 100, such as acceleration/deceleration of the mobile terminal, direction of the mobile terminal, whether a user contacts or not, position of the mobile terminal 100, or opening or closing of the mobile terminal 100. For example, in case the mobile terminal 100 is in a sliding phone type, the sensing unit 140 may sense whether the sliding phone is open or closed. Further, the sensing unit 140 may be responsible for sensing functions related to whether to supply power or whether the interface unit 170 is coupled with an external device. Meanwhile, the sensing unit 140 may include a posture sensor 141 and/or a proximity sensor.

The output unit 150 is provided to generate an output related to senses, such as sight, hearing, or touch, and may include the display unit 151, a sound output unit 152, an alarm unit 153, and a haptic module 154.

The display unit 151 displays information processed in the mobile terminal 100. For example, in case the mobile terminal remains in a call mode, the display unit 151 displays a call-related UI (User Interface) or GUI (Graphic User Interface). In case the mobile terminal 100 remains in a video call mode or in an image capturing mode, the display unit 151 displays a captured and/or received image or UI or GUI.

The display unit 151 may include at least one of a liquid crystal display, a thin film transistor-liquid crystal display, an organic light emitting display, a flexible display, and a 3D display.

Some of the displays may be configured in the transparent or light-transmissive form so that an outside can be viewed therethrough. This may be called 'transparent display', a representative example of which is a transparent LCD. A rear structure of the display unit 151 may be also configured as a light-transmissive structure. Such structure allows a user to view an object behind the terminal body through an area occupied by the display unit 151 in the terminal body.

Depending on how the mobile terminal 100 is implemented, two or more display units 151 may be provided. For example, a plurality of displays may be arranged as one body or to be spaced apart from each other on a surface of the mobile terminal 100, or may be arranged on different surfaces, respectively, of the mobile terminal 100.

In case the display unit 151 and a sensor sensing a touch operation (hereinafter, 'touch sensor') configure a mutual layer structure (hereinafter, 'touch screen'), the display unit 151 may also be used not only as the output device but also as an input device. The touch sensor may have a form, such as, e.g., a touch film, a touch sheet, or a touch pad.

The touch sensor may be configured to convert a change in capacitance, which occurs at a specific area of the display unit 151 or a pressure exerted onto a specific area, into an electrical input signal. The touch sensor may be configured to detect a pressure upon touch as well as the position and area of a touch.

In case there is a touch input on the touch sensor, a corresponding signal(s) is transmitted to a touch controller. The touch controller processes the signal(s) and then transmits corresponding data to the controller 180. By doing so, the controller 180 may be aware of which area of the display unit 151 has been touched.

A proximity sensor may be arranged at an area in the mobile terminal, which is surrounded by the touchscreen or near the touchscreen. The proximity sensor refers to a sensor that detects whether there is an object approaching a predetermined detection surface or an object present nearby, without any mechanical contact, by using an electromagnetic force or infrared light. The proximity sensor has longer lifespan than contact-type sensors and provides various applications.

Examples of the proximity sensor include a transmissive photoelectric sensor, a direct reflective photoelectric sensor, a mirror reflective photoelectric sensor, a high frequency oscillation proximity sensor, a capacitive proximity sensor, a magnetic proximity sensor, or an infrared beam proximity sensor.

In case the touch screen is in a capacitive type, the touch screen is configured so that approach of a cursor is detected based on a change in an electric field due to the approach of the cursor. In such case, the touch screen (touch sensor) may be classified as a proximity sensor.

The proximity sensor senses a proximity touch and proximity touch pattern (for example, a proximity touch distance, proximity touch direction, proximity touch speed, proximity touch time, proximity touch position, proximity touch travelling state, etc.). Information corresponding to the sensed proximity touch operation and proximity touch pattern may be displayed on the touch screen.

The sound output unit 152 may output audio data received from the radio communication unit 110 or stored in the memory 160 in a call signal reception or call mode, or a recording mode, voice recognition mode or broadcast reception mode. The sound output unit 152 outputs a voice signal related to a function performed in the mobile terminal 100 (for example, call signal reception sound or message reception sound). The sound output unit 152 may include a receiver, a speaker, or a buzzer. The sound output unit 152 may output a sound through an earphone jack 116. A user may couple an earphone to the earphone jack 116 to hear an output sound.

The alarm unit 153 may output a signal for informing that an event occurs from the mobile terminal 100. An example of the event occurring from the mobile terminal includes call signal receiving, message receiving, key signal input or touch input. The alarm unit 153 may also output a signal for informing the occurrence of an event in other forms than a video signal or audio signal—for example, a vibration. The video signal or audio signal may also be output through the display unit 151 or the sound output unit 152.

The haptic module 154 generates various tactile effects that may be sensed by a user. A representative example of such tactile effects generated by the haptic module 154 includes a vibration. The strength and pattern of a vibration generated by the haptic module 154 may be controlled. For example, different vibrations may be synthesized with each other and then output or may be sequentially output.

The haptic module 154 may generate various tactile effects other than vibrations, such as an effect obtained by a stimulus generated by a pin arrangement that vertically moves with respect to a contacting skin surface, an effect obtained by a jetting force or sucking force of air generated through a jet port or sucking port, an effect obtained by a stimulus generated when a skin surface is rubbed, an effect obtained by a stimulus generated due to a contact of an electrode, an effect obtained by a stimulus generated using an electrostatic force, or an effect obtained when the sense of being hot or cold is reproduced by a thermal element.

The haptic module 154 may be realized to allow a user to feel a touch through his muscle sense, such as a finger or arm, as well as to transfer a tactile effect through a direct contact. Depending on the configuration of the mobile terminal 100, two or more haptic modules 154 may be provided.

The memory 160 may store a program for the operation of the controller 180 and may temporarily store input/output data (for example, phone books, messages, still images, vides, etc.). The memory 160 may store data relating to various patterns of vibrations and sounds that are output when the touch screen is touched.

The memory 160 may include at least one type of storage medium of a flash memory type memory, a hard disk type memory, a multimedia card micro type memory, a card type memory (e.g., SD or XD memory), a RAM (Random Access Memory, RAM), an SRAM (Static Random Access Memory), a ROM (Read-Only Memory, ROM), an EEPROM (Electrically Erasable Programmable Read-Only Memory), a PROM (Programmable Read-Only Memory), a magnetic memory, a magnetic disc, and an optical disc. The mobile terminal 100 may be operated in association with a web storage that performs a storage function of the memory 160 over the Internet.

The interface unit 170 serves as a path with all external devices connected to the mobile terminal 100. The interface unit 170 receives data or power from an external device and transfers it to each component in the mobile terminal 100 or allows data in the mobile terminal 100 to be transmitted to the external device.

For example, the interface unit 170 may include a wired/wireless headset port, an external recharger port, a wired/wireless data port, a memory card port, a port for connecting a device having an identification module, an audio I/O (Input/Output) port, a video I/O (Input/Output) port, and an earphone port.

The interface unit 170 may include a card slot through which a card-type user identification module may be inserted. Then, the user identification module may be coupled with the mobile terminal 100 through the card slot. At this time, a plurality of user identification modules may be connected to the interface unit 170.

When the mobile terminal 100 is connected to an external cradle, the interface unit 170 may serve as a path through which power is supplied from the cradle to the mobile terminal 100 or a path through which various command signals input through the cradle are transferred to the mobile terminal 100. The various command signals or power input from the cradle may operate as a signal for indicating that the mobile terminal is fittingly mounted on the cradle.

The controller 180 generally controls the overall operation of the mobile terminal. For example, the controller 180 performs control and processing associated with voice call, data communication, or video call. The controller 180 may include a multimedia module 181 for replaying multimedia. The multimedia module 181 may be provided not only in the controller 180 but also separately from the controller 180.

The controller 180 may perform a pattern recognition process that allows a handwriting input and drawing input done on the touch screen to be recognized as a letter and an image, respectively.

The power unit 190 receives external power and internal power under control of the controller 180 and supplies power necessary for operation of each component.

Various embodiments described herein may be implemented in a recording medium that may be read by a computer or a similar device by using software, hardware, or a combination thereof.

When implemented in hardware, the embodiment described herein may be implemented by using at least one of ASICs (application specific integrated circuits), DSPs (digital signal processors), DSPDs (digital signal processing devices), PLDs (programmable logic devices), FPGAs (field programmable gate arrays, processors, controllers, microcontrollers, microprocessors, and electrical units for performing the functions. In some cases, the embodiments may be implemented by the controller 180.

When implemented in software, embodiments such as procedures or functions may be implemented together with a separate software module that enables at least one function or operation to be performed. A software code may be implemented by a software application written in a proper program language. Further, the software code may be stored in the memory 160 and may be executed by the controller 180.

Figure 2:
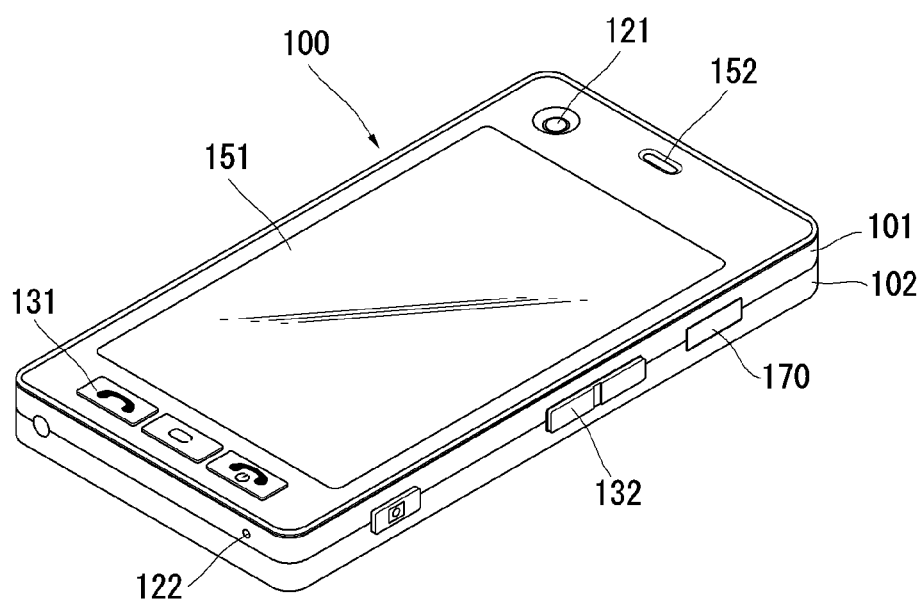
FIG. 2 is a perspective view illustrating a mobile terminal according to the present invention when viewed from a front side.

FIG. 2 is a perspective view illustrating an example of a mobile terminal 100 according to the present invention as it is viewed from the front side.

The disclosed mobile terminal 100 has a bar-shaped terminal body. However, the present invention is not limited thereto, and may be applicable to various structures, such as, e.g., a sliding type in which two or more bodies are combined to each other so that one body may slide on the other, a folder type, a swing type or a swivel type.

The body includes a case (casing, housing, cover, etc.) that forms an outer appearance. In this embodiment, the case may be divided into a front case 101 and a rear case 102. Various electronic parts are embedded in a space between the front case 101 and the rear case 102. At least one middle case may be further provided between the front case 101 and the rear case 102.

The cases may be formed by injection molding plastics, or may be formed of a metallic material, such as stainless steel (STS) or titanium (Ti).

In the terminal body, primarily in the front case 101 may be arranged the display unit 151, the sound output unit 152, the user input unit 130/131, 132, the microphone 122, and the interface unit 170.

The display unit 151 occupies most of a main surface of the front case 101. The sound output unit 152 and the camera 121 are arranged at an area adjacent to one of both ends of the display unit 151, and the user input unit 131 and the microphone 122 are arranged at an area adjacent to the other end. The user input unit 130 is manipulated to receive commands for controlling the operation of the mobile terminal 100, and may include a plurality of manipulation units 131 and 132.

The manipulation units 131 and 132 may be collectively referred to as a manipulating portion, and may adopt any types that may enable a user to manipulate while providing a tactile feeling to the user.

The content input by the manipulation units 131 and 132 may be set variously. For example, the first manipulation unit 131 may receive a command, such as start, end, or scroll, and the second manipulation unit 132 may receive a command, such as adjusting the volume of a sound output from the sound output unit 152 or a shift of the display unit 151 into a touch recognition mode.

Figure 3:
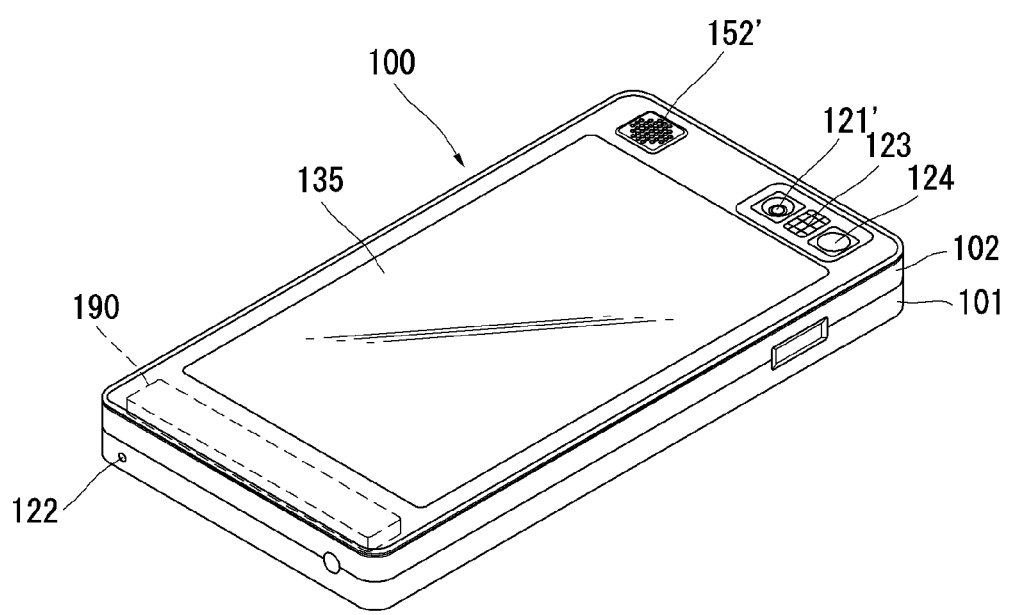
FIG. 3 is a perspective view illustrating a rear surface of the mobile terminal of FIG. 2.

FIG. 3 is a perspective view illustrating a rear surface of the mobile terminal 100 shown in FIG. 2.

Referring to FIG. 3, a camera 121' may be added to a rear surface of the terminal body, i.e., the rear case 102. The camera 121' has an image capturing direction substantially opposite to that of the camera 121 (refer to FIG. 2) and may have a different number of pixels from that of the camera 121.

For example, the camera 121 preferably has a small number of pixels to the extent that an image of a user's face may be readily captured and transmitted to a call receiving party, e.g., when the user performs a video call, and the camera 121' preferably has a large number of pixels since the camera 121' generally takes a picture of an object and the picture is not transmitted in most cases. The camera 121 and the camera 121' may be provided at the terminal body to be rotatable or to pop up.

A flash 123 and a mirror 124 are added adjacent to the rear camera 121'. The flash 123 radiates light to an object when the object is image captured by the rear camera 121'. The mirror 124 allows a user to view his face when he takes a picture of himself (self capturing) with the rear camera 121'. Hereinafter, the rear camera 121' for image capturing the front surface of the mobile terminal 100 is referred to as 'front camera', and the front camera 121 that may image capture the rear surface of the mobile terminal 100 is referred to as 'rear camera'.

A sound output unit 152' may be added to the rear surface of the terminal body. The sound output unit 152' may realize stereo functions together with the sound output unit 152 (refer to FIG. 2A), and may be used to implement a speaker phone mode while on call.

Besides the antenna for call, an antenna 124 for receiving a broadcast signal may be additively provided at a side of the terminal body. The antenna 124 which constitutes a part of the broadcast receiving module 111 (refer to FIG. 1) may be provided to be withdrawn from the terminal body.

The power unit 190 is mounted on the terminal body to supply power to the mobile terminal 100. The power unit 190 may be embedded in the terminal body or may be mounted to be directly detachable at an outside of the terminal body.

A touch pad 135 may be additively mounted on the rear case 102 to sense a touch. The touch pad 135 may also be configured in a light-transmissive type like the display unit 151. In such case, if the display unit 151 is configured to display visual information on both surfaces, the visual information may be recognized through the touch pad 135 as well. The information displayed on the two surfaces may be controlled by the touch pad 135. On the contrary, an extra display may be added to the touch pad 135 so that a touch screen may be arranged on the rear case 102.

The touch pad 135 operates in association with the display unit 151 of the front case 101. The touch pad 135 may be arranged in parallel with a rear side of the display unit 151. Such manipulation units 131 and 132 may have the same or smaller size than that of the display unit 151.

The configuration of the mobile terminal 100 according to the present invention has been described thus far with reference to FIGS. 1 to 3. Hereinafter, a front side danger sensing and alerting function implemented in the mobile terminal 100 according to an embodiment of the present invention are described in detail with reference to FIGS. 4 to 27.

Figure 4:
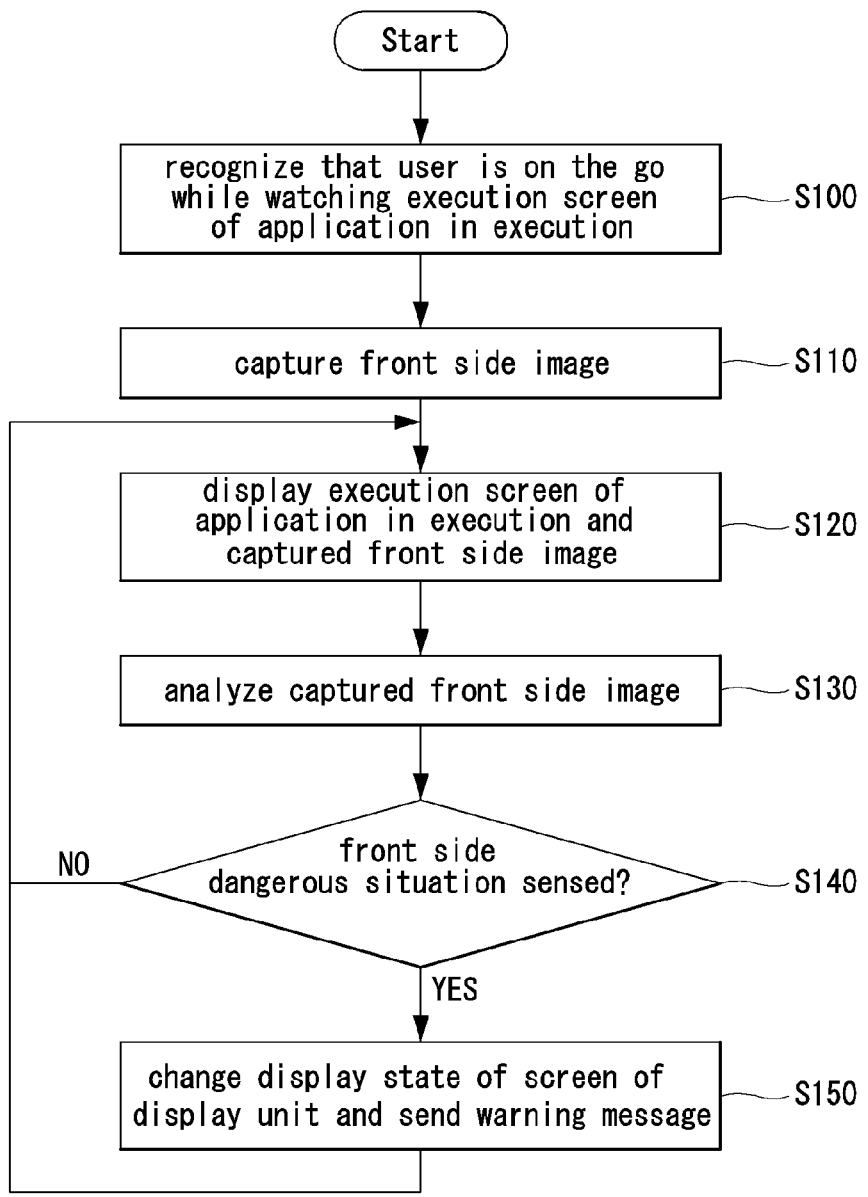
FIG. 4 is a flowchart illustrating a danger sensing and alerting method of a mobile terminal according to the present invention.

FIG. 4 is a flowchart illustrating a danger sensing and alerting method of a mobile terminal 100 according to the present invention. Hereinafter, the danger sensing and alerting function is described with reference to necessary drawings.

First, the controller 180 of the mobile terminal 100 recognizes that a user is on the go while watching the screen of an application in execution (S100). The controller 180 may sense the user walking based on a speed or acceleration, vibration information or illuminance sensed by the sensing unit 140. Further, the controller 180 may also sense the user walking based on the location information of the mobile terminal 100 that is measured by the location information module 115. Further, the controller 180 may also detect the user walking based on a user's image captured by the front camera 121. However, methods of recognizing the user's walking by the mobile terminal 100 are not limited to the above-described examples.

Meanwhile, the controller 180 may recognize that the user is watching the screen of an application in execution based on a user's image captured by the front camera 121. Further, the controller 180 may recognize that the user is watching the screen of an application in execution based on an angle at which the mobile terminal 100 stands with respect to the ground which is sensed by the sensing unit 140. However, methods of recognizing that the user is watching the execution screen by the mobile terminal 100 are not limited to the above-described examples.

If it is recognized that the user is on the go while watching the execution screen of the application, the controller 180 controls the rear camera 121' to capture a front side image (S110) and displays the captured front side image on the display unit 151 together with the execution screen of the application (S120).

Figure 5:
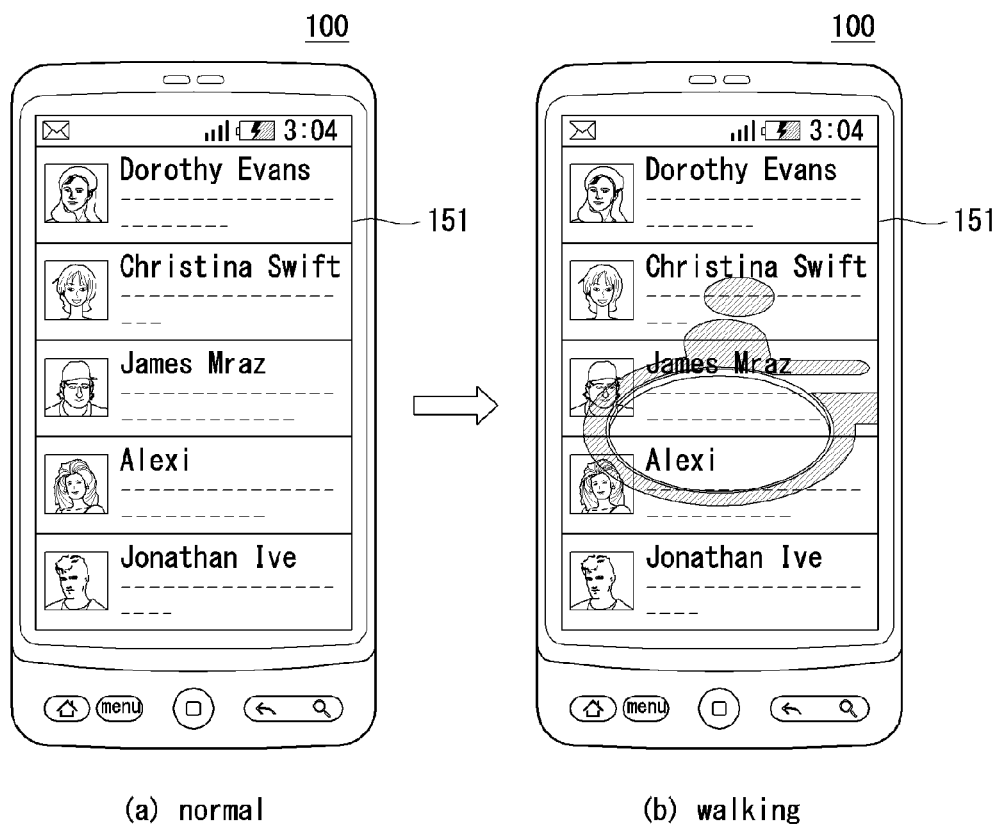
FIGS. 5 and 6 illustrate examples where a captured front side image, together with an execution screen of an application being executed by the mobile terminal 100, is displayed.
Figure 6:
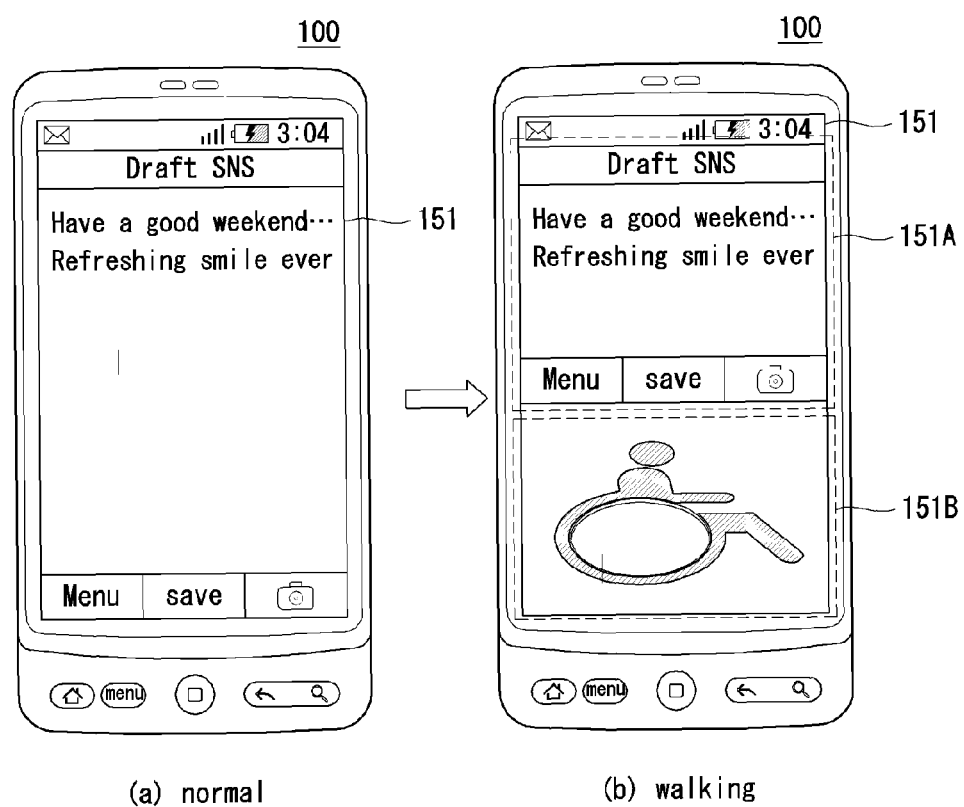

FIGS. 5 and 6 illustrate examples where a captured front side image, together with an execution screen of an application being executed by the mobile terminal 100, is displayed.

Referring to FIG. 5(*a*), the mobile terminal 100 displays only an execution screen of a specific SNS application in execution on the display unit 151 while remaining in a normal state. However, Referring to FIG. 5(*b*), while the user is on the go, the mobile terminal 100 displays the execution screen of the specific SNS application in execution, with the execution screen overlapping the captured front side image.

Referring to FIG. 6(*a*), the mobile terminal 100 displays only an execution screen of an SMS application in execution while remaining in a normal state. However, Referring to FIG. 6(*b*), while the user is on the go, the mobile terminal 100 displays the execution screen 151A of the SMS application in execution on a separate area of the display unit 151, with the execution screen 151A separated from the captured front side image 151B.

Meanwhile, methods of displaying a front side image captured while the mobile terminal 100 is on the go on the display unit 151 are not limited to the examples described above in connection with FIGS. 5 and 6.

Referring back to FIG. 4, the controller 180 analyzes the captured front side image (S130), and determines whether a front side dangerous situation is sensed as a result of the analysis (S140). If a front side dangerous situation is sensed, the controller 180 may transfer a warning message to the user by changing the display state of the display unit 151 (S150). However, if no front side dangerous situation is sensed, the controller 180 may repeatedly perform the above-described steps S120 to S140. Meanwhile, the warning message may include a voice message or an alarming message informing that there is a dangerous situation at the front side. However, the present invention is not limited thereto, and the warning message may include any means that may alert the user to presence of a dangerous situation at the front side.

Figure 7:
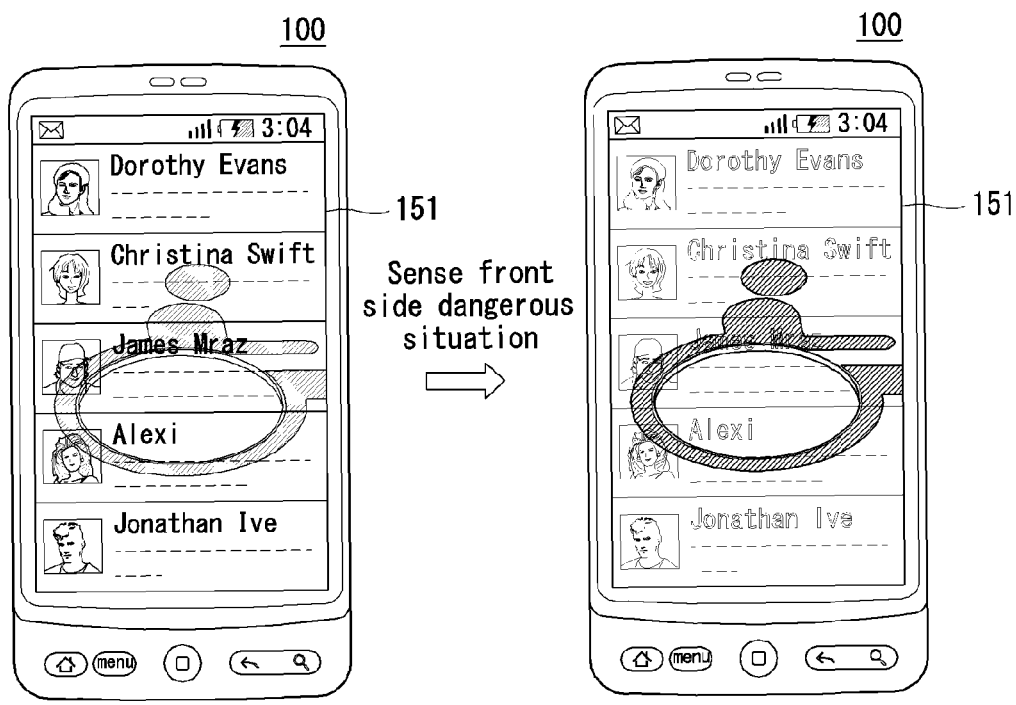
FIGS. 7 and 8 illustrate examples where a mobile terminal according to the present invention transfers a warning message indicating that a front side dangerous situation is sensed to a user by changing a display state of the display unit.
Figure 8:
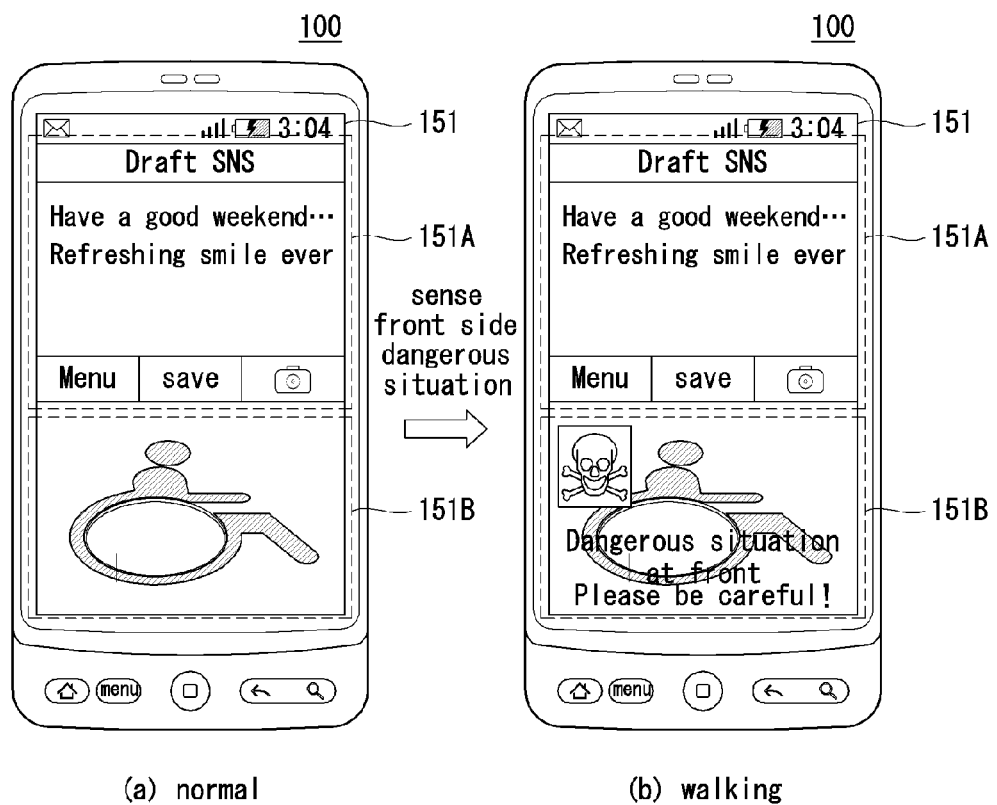

FIGS. 7 and 8 illustrate examples where a mobile terminal 100 according to the present invention transfers a warning message indicating that a front side dangerous situation is sensed to a user by changing a display state of the display unit 151.

Referring to FIG. 7, if a front side dangerous situation is sensed while a user is on the go and an execution screen of an SNS application in execution is displayed, with the execution screen overlapping a front side image, the mobile terminal 100 increases the degree of transparency of the execution screen of the SNS application and reduces the degree of transparency of the captured front side image, thereby displaying the front side image more clearly. Then, the user may recognize the front side dangerous situation more quickly and easily. That is, upon sensing the front side dangerous situation, the mobile terminal 100 according to the present invention may send the user a warning message by changing the display state of the captured front side image output through the display unit 151.

Referring to FIG. 8, if a front side dangerous situation is sensed while a user is on the go and an execution screen 151A of an SMS application in execution is displayed to be separated from a captured front side image 151B, the mobile terminal 100 may display a separate warning image and warning message on the captured front side image. Then, the user may recognize the front side dangerous situation more rapidly and easily.

Although not shown in FIGS. 7 and 8, if a result of analysis of the captured front side image shows that a front side dangerous situation is sensed, the mobile terminal 100 may alert the user to presence of the front side dangerous situation by outputting an alert sound or alert message through the sound output unit 152.

Figure 9:
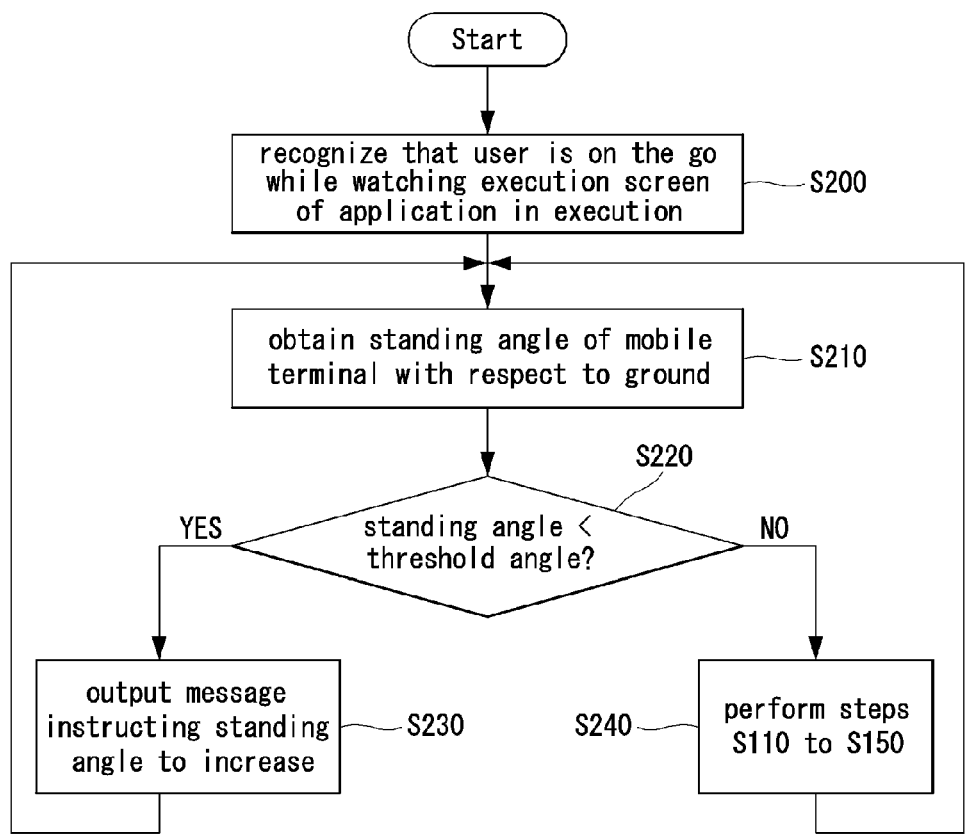
FIG. 9 is a flowchart illustrating another example of a danger sensing and alarming method of a mobile terminal according to the present invention.

FIG. 9 is a flowchart illustrating another example of a danger sensing and alarming method of a mobile terminal 100 according to the present invention. Hereinafter, the danger sensing and alarming functions are described with reference to necessary drawings.

First, the controller 180 of the mobile terminal 100 recognizes that a user is on the go while watching an execution screen of an application in execution (S200). Then, the controller 180 obtains an angle at which the mobile terminal 100 stands with respect to the ground (S210). The standing angle may be obtained by at least one sensor included in the sensing unit 140.

Figure 10:
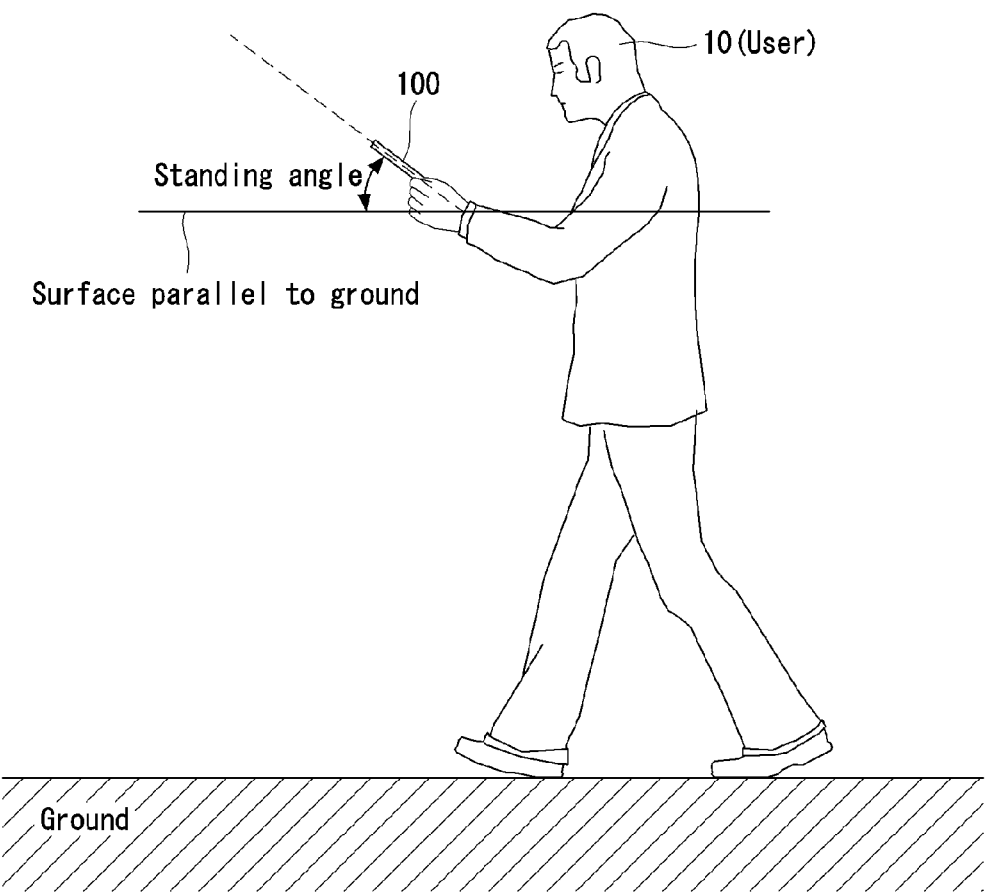
FIG. 10 is a view illustrating a standing angle of a mobile terminal according to the present invention.

FIG. 10 is a view illustrating a standing angle of a mobile terminal 100 according to the present invention. Referring to FIG. 10, in case a user 10 is walking while watching the mobile terminal 100, an angle between the mobile terminal 100 and the ground is the standing angle of the mobile terminal 100.

Referring back to FIG. 9, if the standing angle of the mobile terminal 100 is sensed, the controller 180 determines whether the sensed standing angle is smaller than a predetermined threshold angle (S220). If the sensed standing angle is smaller than the threshold angle, the controller 180 outputs through the output unit 150 a message instructing the standing angle of the mobile terminal 100 to increase (S230). The message may be a voice message or an image message. If the user checks the output message and increases the standing angle of the mobile terminal 100, the controller 180 performs steps S210 and S220 again.

The reason why in case the sensed standing angle is smaller than the threshold angle, the message is output is that when the sensed standing angle is smaller than the threshold angle, a range in which a front side dangerous situation may be sensed is too restrictive. This will be described below in greater detail with reference to FIG. 11.

However, if the sensed standing angle is larger than the threshold angle, the controller 180 may perform steps S110 to S150 illustrated in FIG. 4 to thereby conduct the operations, such as provision of a captured front side image through the display unit 151, sensing a front side dangerous situation, and sending a warning message to the user (S240). Thereafter, the controller 180 performs steps S210 and S220 again.

Figure 11:
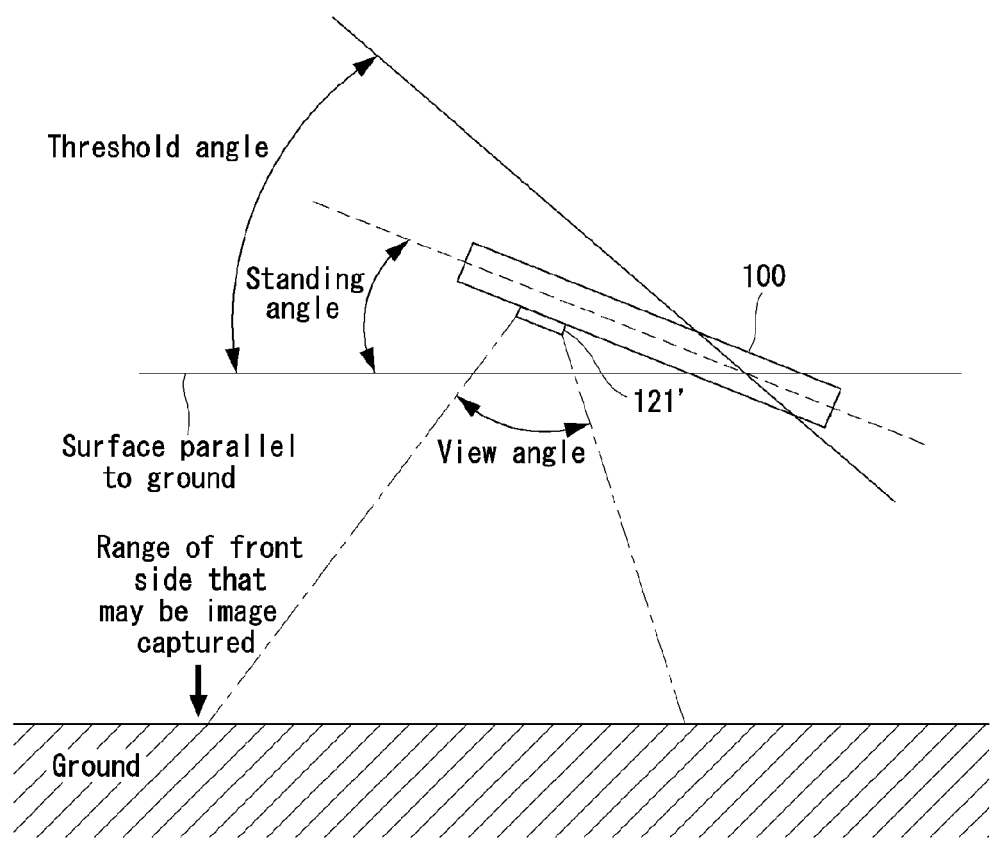
FIG. 11 is a view illustrating a relationship between a standing angle of a mobile terminal according to the present invention and a range of sensing a front side dangerous situation.

FIG. 11 is a view illustrating a relationship between a standing angle of a mobile terminal 100 according to the present invention and a range of sensing a front side dangerous situation. Referring to FIG. 11, a range in which the mobile terminal 100 may sense a front side dangerous situation based on a captured front side image may vary based on a standing angle of the mobile terminal 100. That is, the view angle of the rear camera 121' for capturing a front side image is generally fixed, and thus, the front side dangerous situation sensing range of the mobile terminal 100 may be determined depending on how upright the user makes the mobile terminal 100 stand.

Thus, in case the standing angle of the mobile terminal 100 is smaller than the threshold angle so that the front side dangerous situation sensing range is too narrow, the controller 180 outputs a message requesting the user to increase the standing angle of the mobile terminal 100 so as to increase the front side dangerous situation sensing range.

Figure 12:
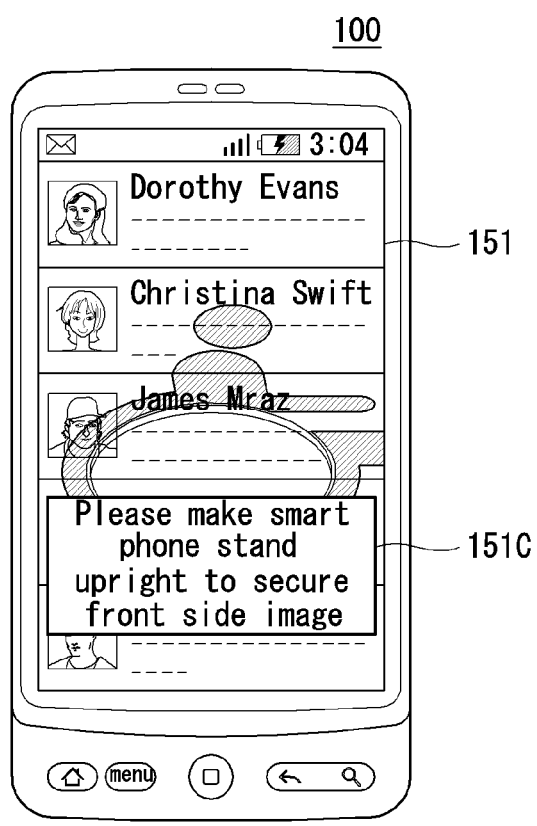
FIG. 12 illustrates an example of a guiding message displayed on the display unit in case a standing angle of a mobile terminal according to the present invention is smaller than a threshold angle.

FIG. 12 illustrates an example of a guiding message displayed on the display unit 151 in case a standing angle of a mobile terminal 100 according to the present invention is smaller than a threshold angle. Referring to FIG. 12, in case the standing angle is smaller than the threshold angle so that a range of a front side area that may be captured is narrower than a predetermined range, the mobile terminal 100 may output a message requesting the user to make the smart phone stand upright in order to secure a front side image.

Figure 13:
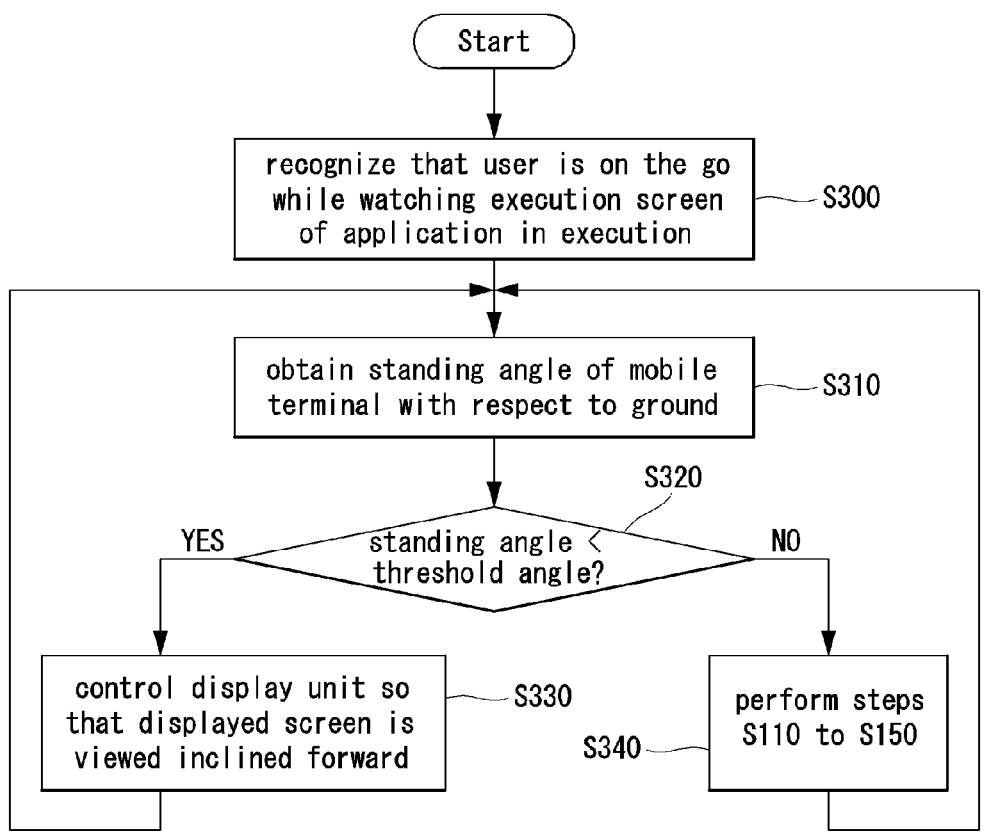
FIG. 13 is a flowchart illustrating still another example of a danger sensing and alarming method of a mobile terminal according to the present invention.

FIG. 13 is a flowchart illustrating still another example of a danger sensing and alarming method of a mobile terminal 100 according to the present invention. Hereinafter, the danger sensing and alarming functions are described with reference to necessary drawings.

First, the controller 180 of the mobile terminal 100 recognizes that a user is on the go while watching an execution screen of an application in execution (S300). Then, the controller 180 obtains a standing angle of the mobile terminal 100 with respect to the ground (S310).

If the standing angle of the mobile terminal 100 is sensed, the controller 180 determines whether the sensed standing angle is smaller than a predetermined threshold angle (S320). If the sensed standing angle is smaller than the threshold angle, the controller 180 controls the display unit 151 so that the displayed screen is displayed inclined toward the front side (S330).

That is, if the sensed standing angle is smaller than the threshold angle, the controller 180 controls the display unit 151 so that the screen of the display unit 151 is displayed rotated with respect to a virtual horizontal axis of a lower end portion of the screen. Then, the user increases the standing angle of the mobile terminal 100 to view the normally displayed screen, and the controller 180 then performs steps S310 and S320 again.

However, if the sensed standing angle is larger than the threshold angle, the controller 180 may perform steps S110 to S150 illustrated in FIG. 4 to thereby conduct the operations, such as provision of the captured front side image through the display unit 151, sensing a front side dangerous situation based on the analysis of the front side image, and sending a warning message to the user upon sensing a front side dangerous situation (S340). Thereafter, the controller 180 performs steps S310 and S320 again.

FIG. 14 is a view illustrating an example where the displayed screen is displayed to be viewed as being inclined according to the danger sensing and alarming method illustrated in FIG. 13. Referring to FIG. 14(*a*), if the sensed standing angle is smaller than the threshold angle, the mobile terminal 100 controls the display unit 151 so that a screen visually recognized by the user is displayed inclined toward the front side. FIG. 14(*b*) illustrates an example viewed from a side surface, where a user recognizes a screen rotated frontward with respect to an actual screen. Meanwhile, a virtual rotation angle at which the screen is rotated frontward may be set differently depending on an angle between the sensed standing angle and the threshold angle.

Figure 15:
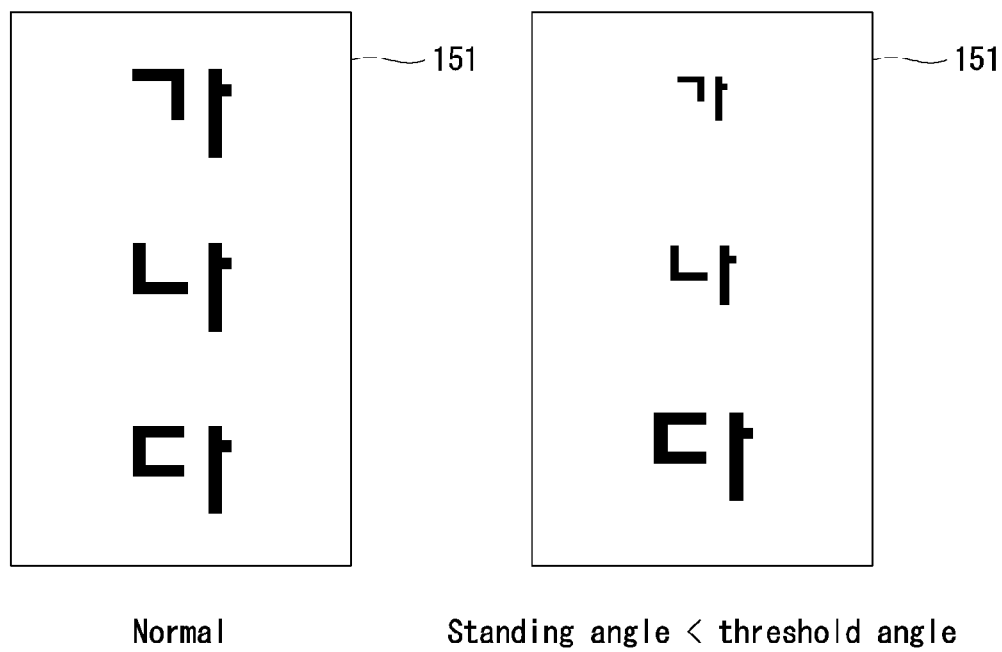
FIGS. 15 and 16 illustrate examples where in case a standing angle of a mobile terminal according to the present invention is smaller than a threshold angle, a screen is viewed as being inclined frontward according to the danger sensing and alarming method illustrated in FIG. 13.
Figure 16:
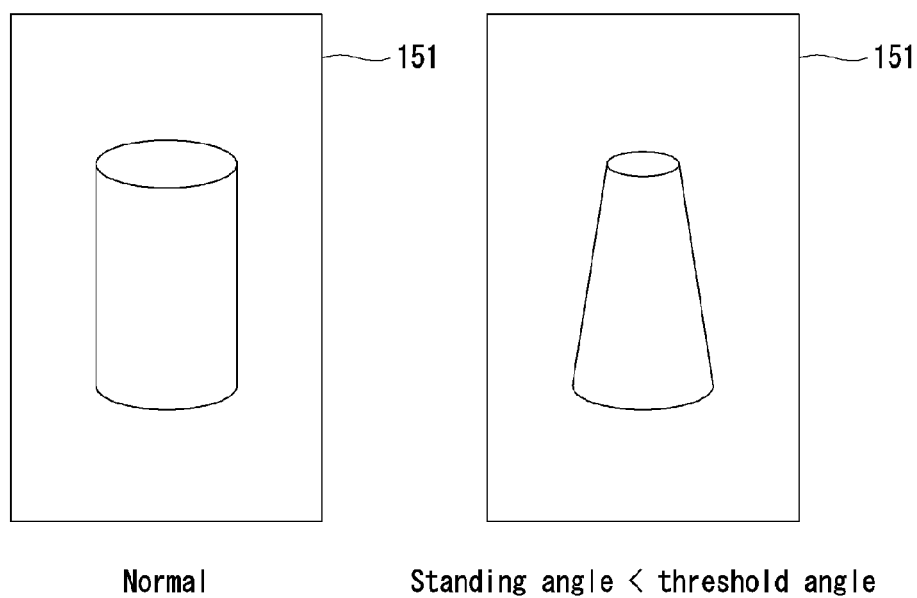

FIGS. 15 and 16 illustrate examples where in case a standing angle of a mobile terminal 100 according to the present invention is smaller than a threshold angle, a screen is viewed as being inclined frontward according to the danger sensing and alarming method illustrated in FIG. 13.

Referring to FIG. 15, in case the standing angle of the mobile terminal 100 is smaller than the threshold angle, a letter positioned closer to the top end of the screen looks smaller. Further, Referring to FIG. 16, in case the standing angle of the mobile terminal 100 is smaller than the threshold angle, the width of a cylinder decreases as it goes to the top end of the screen.

Figure 17:
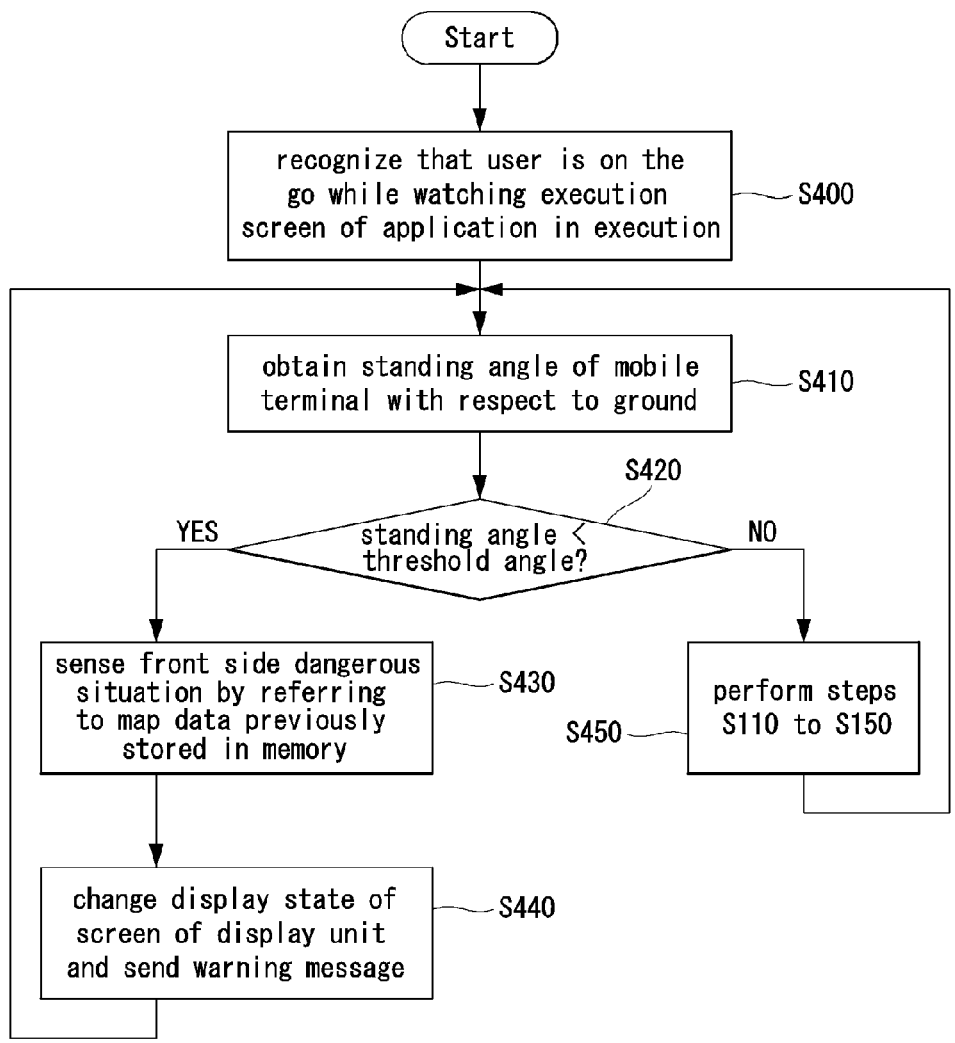
FIG. 17 is a flowchart illustrating yet still another example of a danger sensing and alarming method of a mobile terminal according to the present invention.

FIG. 17 is a flowchart illustrating yet still another example of a danger sensing and alarming method of a mobile terminal according to the present invention. Hereinafter, the danger sensing and alarming functions are described with reference to necessary drawings.

First, the controller 180 of the mobile terminal 100 recognizes that a user is on the go while watching an execution screen of an application in execution (S400). Then, the controller 180 obtains a standing angle of the mobile terminal 100 with respect to the ground (S410).

If the standing angle of the mobile terminal 100 is sensed, the controller 180 determines whether the sensed standing angle is smaller than a predetermined threshold angle (S420). If the sensed standing angle is smaller than the threshold angle, the controller 180 senses a front side dangerous situation by referring to map data previously stored in the memory 160 (S430), changes the display state of the screen of the display unit 151, and sends a warning message to the user (S440). At this time, the controller 180 may use the location information of the mobile terminal 100, which is obtained by the location information module 115, to sense the front side dangerous situation.

Of course, even in this case, the controller 180 may image capture a front side through the rear camera 121' and may use the captured front side image to sense a front side dangerous situation. Thereafter, the controller 180 performs steps S410 and S420 again.

However, if the sensed standing angle is larger than the threshold angle, the controller 180 may perform steps S110 to S150 illustrated in FIG. 4 to thereby conduct the operations, such as provision of the captured front side image through the display unit 151, sensing a front side dangerous situation based on analysis of the front side image, and sending a warning message to the user upon sensing the front side dangerous situation (S450). Then, the controller 180 performs steps S410 and S420 again.

Similar to what is illustrated in FIG. 17, in case the sensed standing angle is smaller than the threshold angle, the mobile terminal 100 according to the present invention may utilize a captured front side image previously stored in the memory. Here, the captured front side image previously stored may be a front side image captured while the user was walking on the same path in the pas or a front side image captured while the user is currently walking with the standing angle of the mobile terminal 100 larger than the threshold angle.

Figure 18:
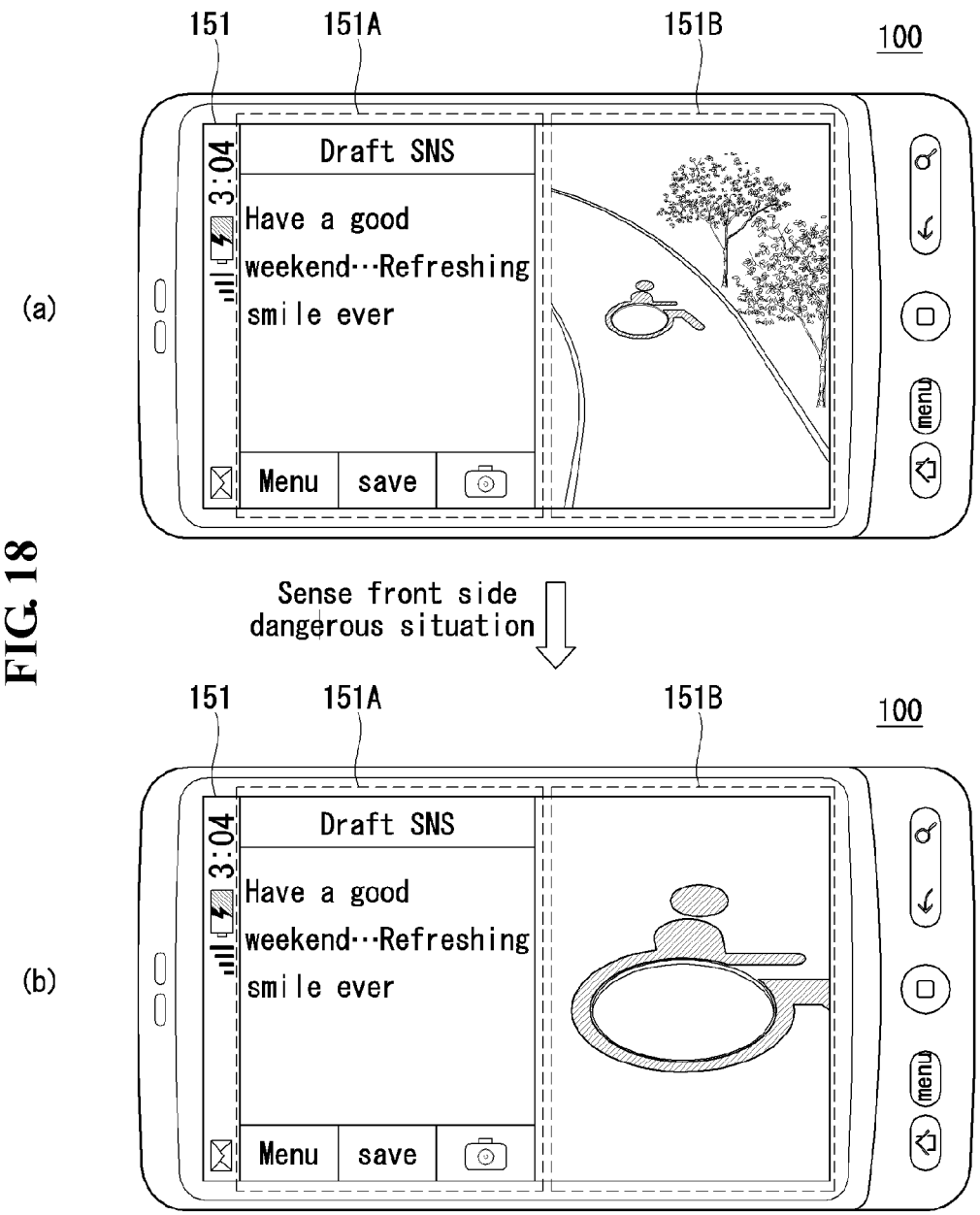
FIG. 18 illustrates an example wherein, in case a front side dangerous situation is sensed by a mobile terminal according to the present invention, the front side dangerous situation of a front side image is displayed on the display unit in a magnified state.

FIG. 18 illustrates an example wherein, in case a front side dangerous situation is sensed by a mobile terminal 100 according to the present invention, the front side dangerous situation of a front side image is displayed on the display unit 151 in a magnified state.

FIG. 18(a) illustrates an example where as a result of analysis of a front side image, the controller 180 of the mobile terminal 100 senses an open manhole as the front side dangerous situation. Then, the controller 180 of the mobile terminal 100 may display the manhole, which is the front side dangerous situation, in a magnified state as shown in FIG. 18(b).

Although not shown in the drawings, if as a result of analysis of the front side image, a front side dangerous situation is sensed, the mobile terminal 100 according to the present invention may control the rear camera 121' so that a focus for capturing the front side image is oriented to the sensed front side dangerous situation. Then, the sensed front side dangerous situation of the front side image may be displayed more clearly, so that the user may visually recognize the front side dangerous situation more readily.

Figure 19:
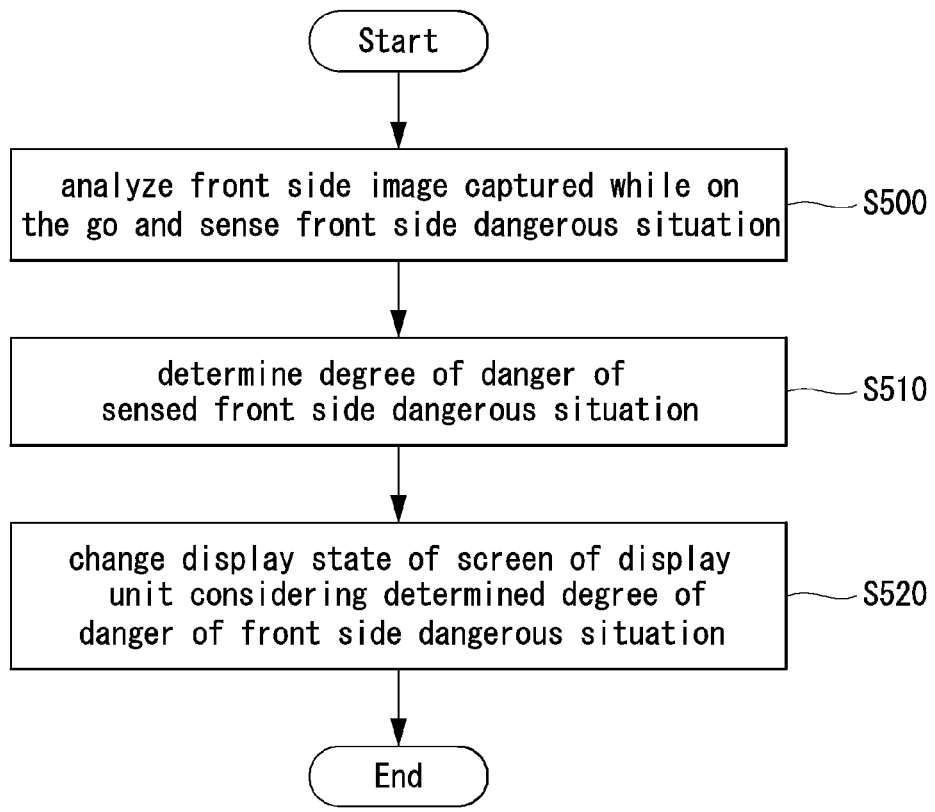
FIG. 19 is a flowchart illustrating yet still another example of a danger sensing and alarming method of a mobile terminal according to the present invention.

FIG. 19 is a flowchart illustrating yet still another example of a danger sensing and alarming method of a mobile terminal 100 according to the present invention. Hereinafter, the danger sensing and alarming functions are described with reference to necessary drawings.

The controller 180 of the mobile terminal 100 analyzes a front side image captured while on the go and thereby senses a front side dangerous situation (S500). Thereafter, the controller 180 determines the degree of danger of the sensed front side dangerous situation (S510). Here, the degree of danger of the front side dangerous situation may be determined depending on the type of the sensed front side dangerous situation.

For example, the controller 180 may determine that an opened manhole that is a front side dangerous situation is higher in degree of danger than an electricity pole that is another front side dangerous situation. Further, the controller 180 may increase the degree of danger of a front side dangerous situation as a distance from the front side dangerous situation decreases. Further, the controller 180 may determine the degree of danger of a front side dangerous situation based on the speed of approach to the sensed front side dangerous situation. Meanwhile, methods of determining the degree of danger of a front side dangerous situation by the controller 180 are not limited to the above-described examples.

Thereafter, the controller 180 sends a warning message to the user by changing the display state of the screen of the display unit 151 in consideration of the determined degree of danger of the front side dangerous situation (S520). For example, the controller 180 may vary the degree of transparency of the captured front side image or the type of at least one of the separate alarming sound and the separate alarming image depending on the degree of danger of the sensed front side dangerous situation.

Figure 20:
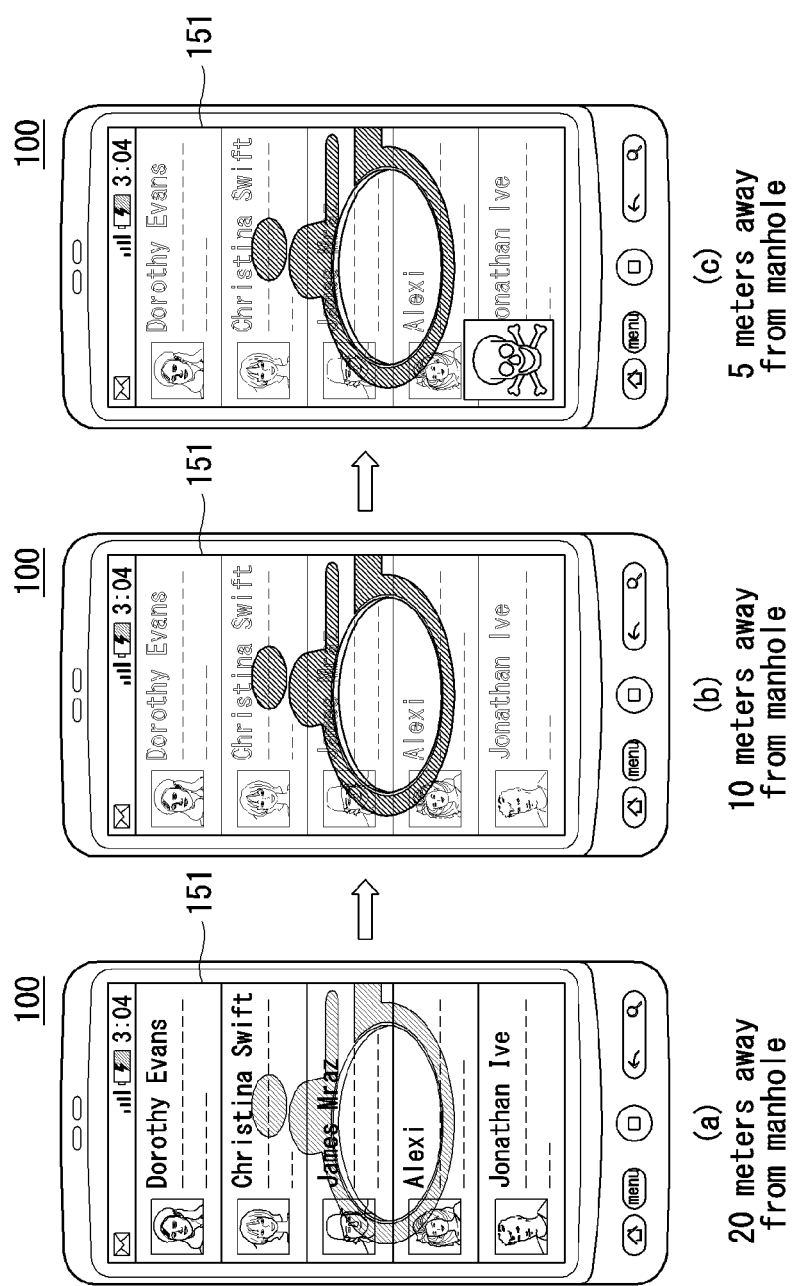
FIG. 20 illustrates an example where the screen state of the display unit of the mobile terminal according to the present invention is changed based on the degree of danger of the front side dangerous situation according to the danger sensing and alarming method illustrated in FIG. 19.

FIG. 20 illustrates an example where the screen state of the display unit 151 of the mobile terminal 100 according to the present invention is changed based on the degree of danger of the front side dangerous situation according to the danger sensing and alarming method illustrated in FIG. 19. For reference, the front side image displayed on the display unit 151 in FIG. 20 is fixed as a manhole—which is a front side dangerous situation—being displayed magnified.

FIG. 20(a) illustrates an example where in case a distance from a manhole which is a front side dangerous situation is 20 meters, an execution screen is displayed while overlapping a front side image. FIG. 20(b) illustrates an example where in case the distance from the manhole decreases up to 10 meters, the degree of transparency of the front side image decreases so that the front side image is more clearly displayed on the display unit 151. FIG. 20(c) illustrates an example where the distance from the manhole is further reduced up to 5 meters, an image is additively displayed to alert the user to a danger with the degree of transparency of the front side image further reduced.

This means that as the degree of danger of the front side dangerous situation sensed as a result of analysis of the front side image increases, the strength of a message to be sent to the user increases.

Figure 21:
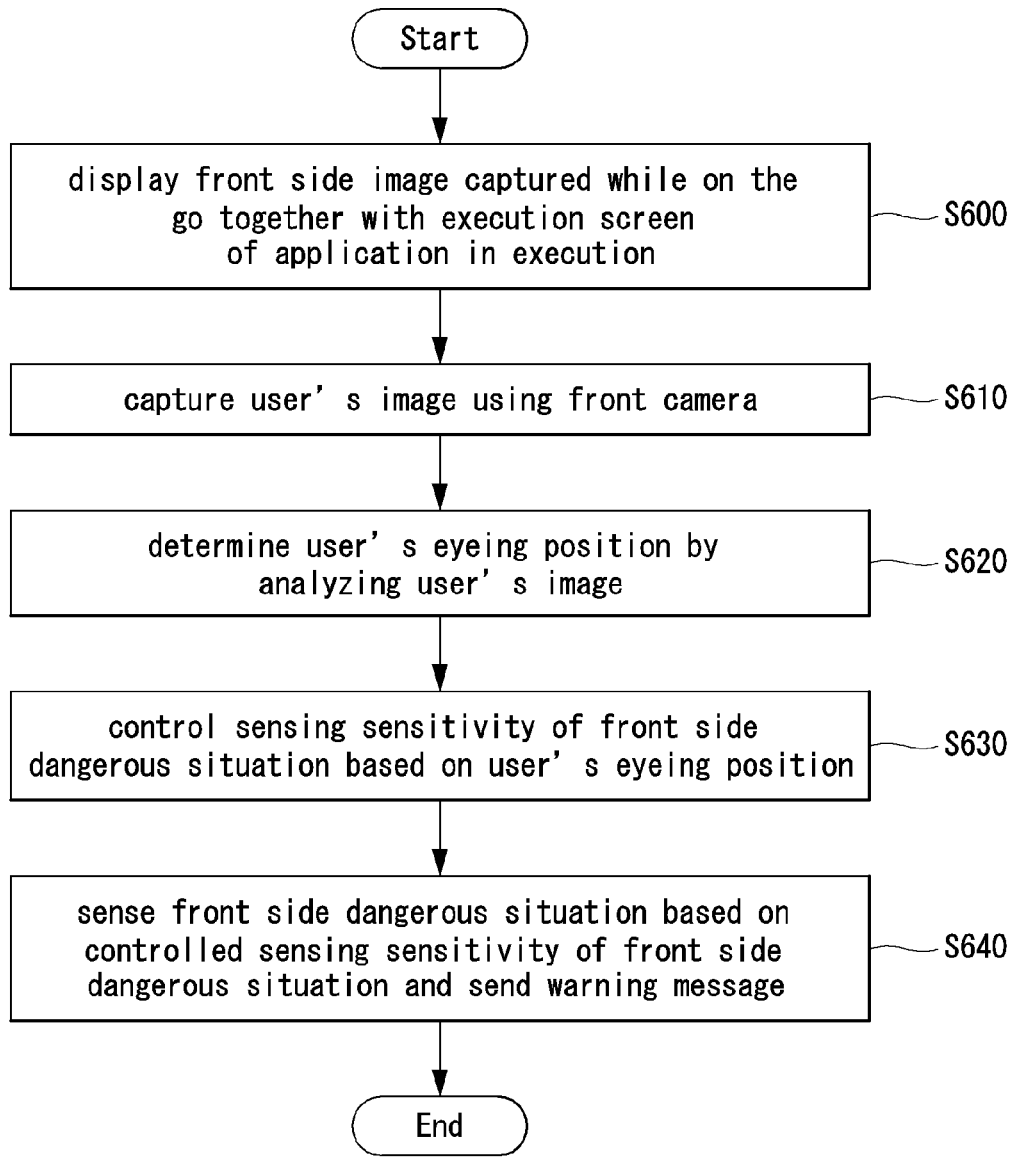
FIG. 21 is a flowchart illustrating yet still another example of a danger sensing and alarming method of a mobile terminal according to the present invention.

FIG. 21 is a flowchart illustrating yet still another example of a danger sensing and alarming method of a mobile terminal 100 according to the present invention. The danger sensing and alarming functions are described with reference to necessary drawings.

The mobile terminal 100 displays, on the display unit 151, a front side image captured while on the go together with an execution screen of an application in execution (S600). Then, the controller 180 captures a user's image by using the front camera 121 (S610). Thereafter, the controller 180 analyzes the user's image to determine a position which the user is eyeing (S620).

Then, the controller 180 controls a sensing sensitivity of a front side dangerous situation based on the user's eyeing position (S630). Thereafter, the controller 180 analyzes the captured front side image based on the controlled sensing sensitivity of the front side dangerous situation and performs a function of sensing a front side dangerous situation and sending a warning message (S640).

FIG. 22 illustrates an example where the mobile terminal 100 according to the present invention analyzes a user's image captured through the front camera 121 and determines the user's eyeing position according to the danger sensing and alarming method illustrated in FIG. 21.

As shown in FIG. 22(a), in case the user's eyeing position is toward a front side but not toward the display unit 151 of the mobile terminal 100, the controller 180 may decrease the sensing sensitivity of the front side dangerous situation. However, as shown in FIG. 22(b), in case the user's eyeing position is toward the display unit 151 of the mobile terminal 100, the controller 180 may increase the sensing sensitivity of the front side dangerous situation.

If the sensing sensitivity of the front side dangerous situation is increased, the controller 180 may increase the strength of a warning message even on a front side dangerous situation having the same degree of danger. Further, if the sensing sensitivity of the front side dangerous situation is increased, the controller 180 may sense, as a front side dangerous situation, a front side dangerous situation, which is not sensed as a front side dangerous situation before the sensing sensitivity of the front side dangerous situation is increased.

However, if the sensing sensitivity of the front side dangerous situation is decreased, the controller 180 may reduce the strength of a warning message even on a front side dangerous situation having the same degree of danger. Further, if the sensing sensitivity of the front side dangerous situation is decreased, the controller 180 may not sense, as a front side dangerous situation, a front side dangerous situation that is sensed as a front side dangerous situation before the sensing sensitivity of the front side dangerous situation is increased.

An example has been thus far described with reference to FIGS. 21 and 22, in which the sensing sensitivity of the front side dangerous situation is determined based on the user's eyeing position by the mobile terminal 100 according to the present invention. However, the mobile terminal 100 according to the present invention may also control the sensing sensitivity of the front side dangerous situation based on the type of the application in execution and whether the user manipulates the keyboard.

Figure 23:
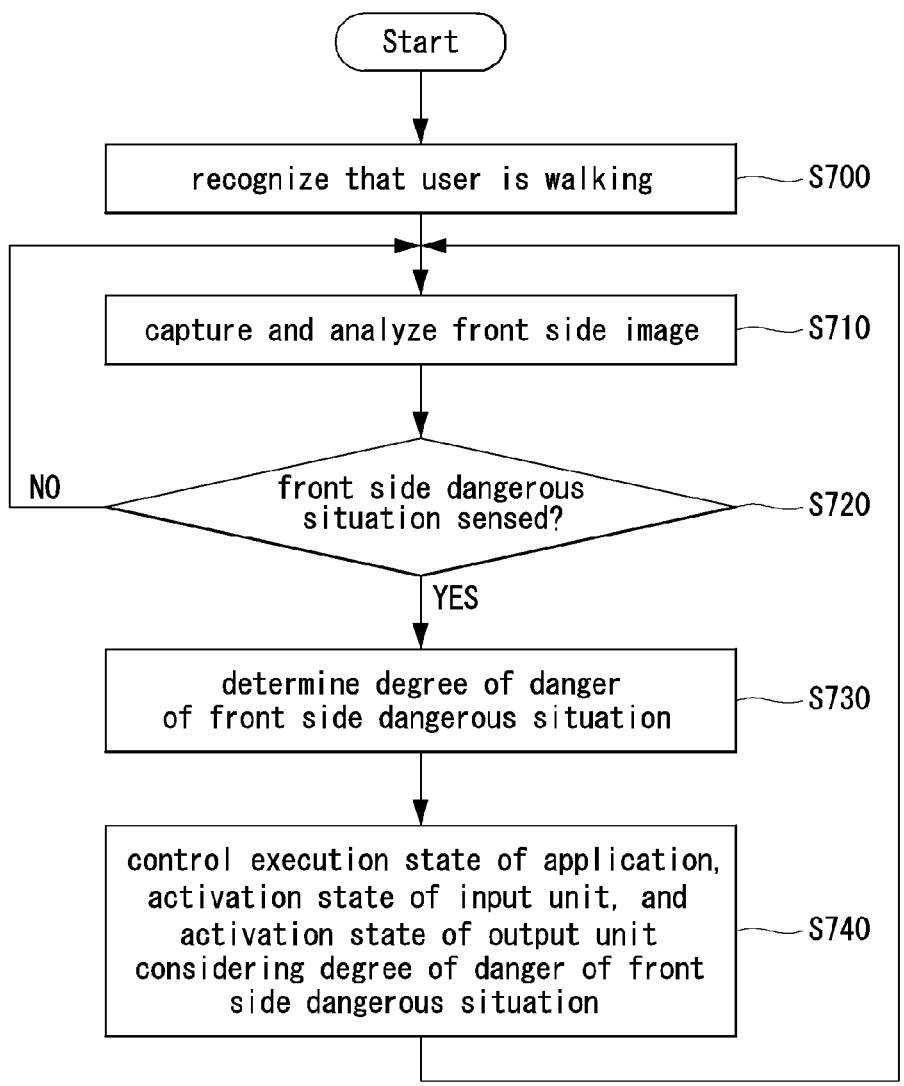
FIG. 23 is a flowchart illustrating yet still another example of a danger sensing and alarming method of a mobile terminal according to the present invention.

FIG. 23 is a flowchart illustrating yet still another example of a danger sensing and alarming method of a mobile terminal 100 according to the present invention. Hereinafter, the danger sensing and alarming functions are described with reference to necessary drawings.

The controller 180 of the mobile terminal 100 recognizes that a user is on the go by using an image captured through the camera 121' or camera 121' and data sensed by various sensors included in the sensing unit 140 (S700). Then, the controller 180 captures a front side image using the rear camera 121' and analyzes the captured front side image (S710).

Thereafter, the controller 180 determines whether a front side dangerous situation is sensed based on a result of the analysis of the front side image (S720). If no front side dangerous situation is sensed, the controller 180 performs steps S700 to S720 again.

However, if a front side dangerous situation is sensed, the controller 180 determines the degree of danger of the sensed front side dangerous situation (S730). The degree of danger of the front side dangerous situation may be determined depending on what the sensed front side dangerous situation is. For example, the degree of danger of a vehicle sensed at the front side of the user may be higher than the degree of danger of a human sensed at the front side of the user. Further, the degree of danger of the front side dangerous situation may be determined based on a distance from the dangerous situation, whether the dangerous situation is moving, speed of approach of the user to the dangerous situation, speed of walk, and direction of walk.

If the degree of danger of the front side dangerous situation is determined, the controller 180 may send a warning message to the user by controlling at least one of an execution state of the application in execution, an activation state of the A/V (Audio/Video) input unit 120, and an activation state of the output unit 150 in consideration of the degree of danger of the front side dangerous situation (S740). For example, the controller 180 may send a warning message to the user by controlling the execution state of the application in execution if the front side dangerous situation has a level higher than a predetermined level. Further, if the degree of danger of the front side dangerous situation is higher than a predetermined level, the controller 180 may inactivate the input function through the A/V (Audio/Video) input unit 120. Further, if the degree of danger of the front side dangerous situation is higher the predetermined level, the controller 180 may inactivate at least one of the output functions of the output unit 150.

Figure 24:
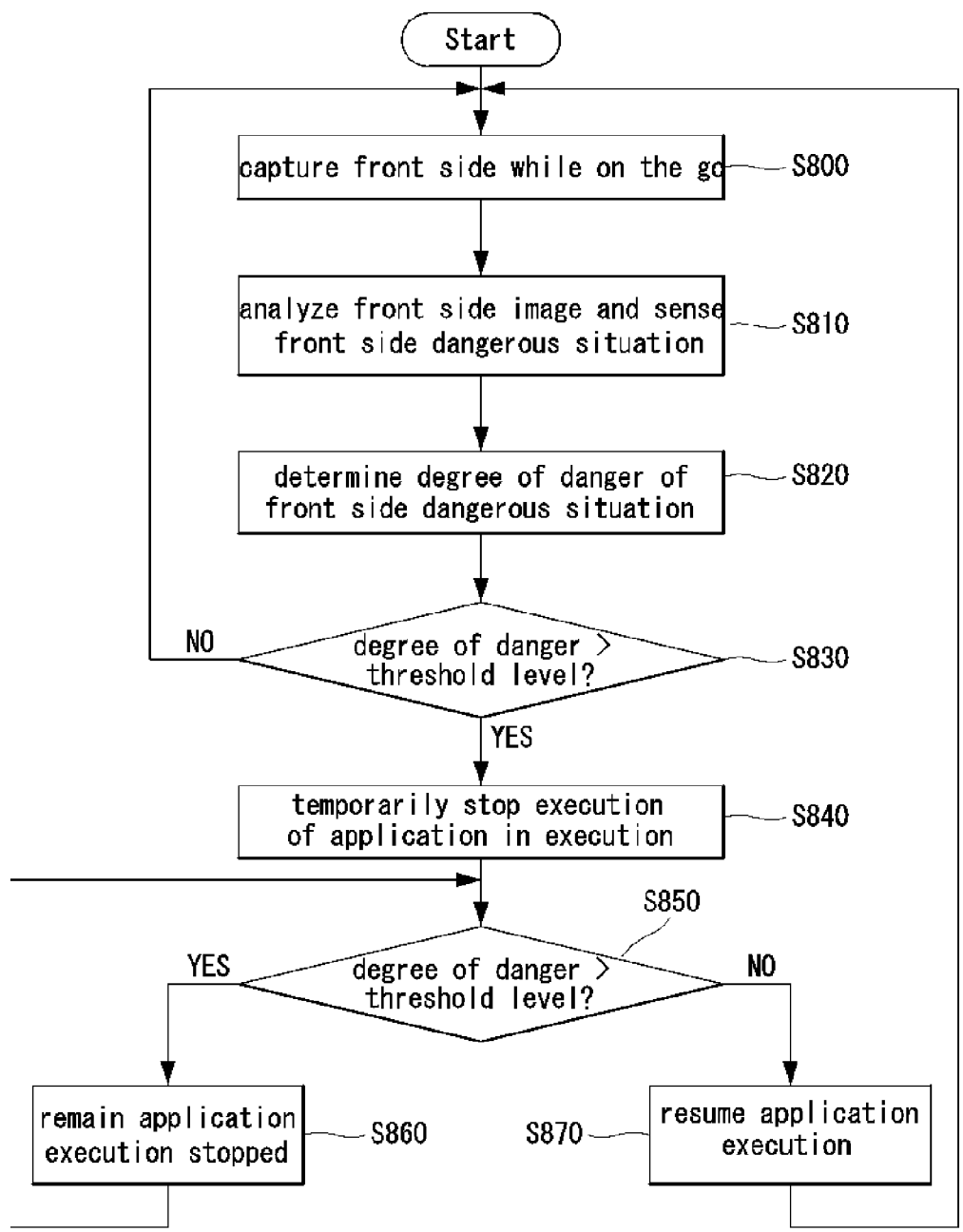
FIG. 24 is a flowchart illustrating an example of the danger sensing and alarming method illustrated in FIG. 23.

FIG. 24 is a flowchart illustrating an example of the danger sensing and alarming method illustrated in FIG. 23. Hereinafter, the danger sensing and alarming method is described with reference to necessary drawings.

The controller 180 captures a front side image while on the go by controlling the rear camera 121' (S800). Then, the controller 180 senses a front side dangerous situation by analyzing the front side image (S810) and determines the degree of danger of the sensed front side dangerous situation (S820).

Thereafter, the controller 180 determines whether the degree of danger of the front side dangerous situation is higher than a predetermined threshold level (S830). Unless the degree of danger of the front side dangerous situation is higher than the threshold level, the controller 180 performs steps S800 to S830.

However, if the degree of danger of the front side dangerous situation is higher than the predetermined threshold level, the controller 180 temporarily stops execution of the application in execution (S840). Then, the controller 180 determines whether the degree of danger of the front side dangerous situation is higher than a predetermined threshold level (S850). If the degree of danger of the front side dangerous situation is higher than the predetermined threshold level, the controller 180 remains the execution state of the application being stopped (S860).

However, if the degree of danger of the front side dangerous situation is lower than the predetermined threshold level, the controller 180 resumes the stopped execution of the application (S870). Thereafter, the controller 180 performs step S800 again.

Figure 25:
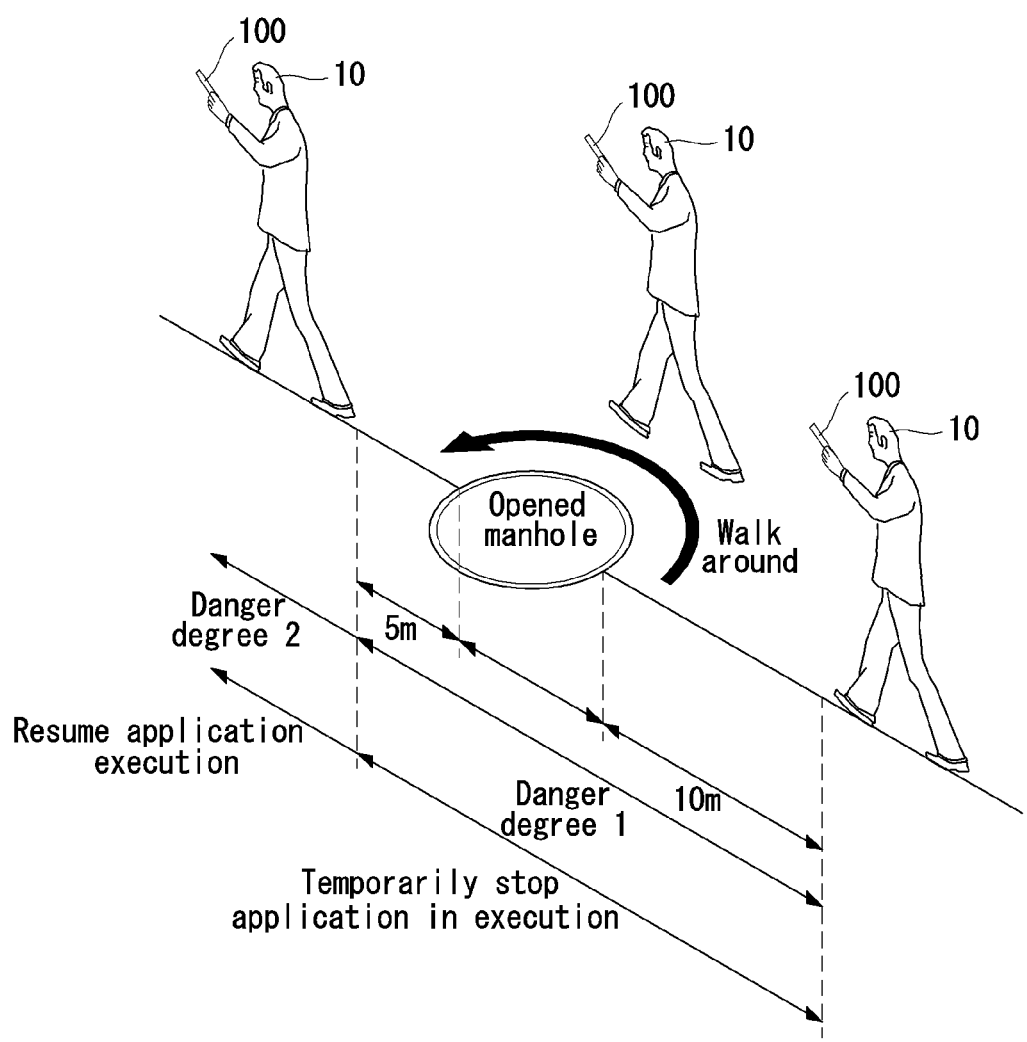
FIG. 25 illustrates an example where an execution state of an application in execution is controlled by the mobile terminal according to the present invention according to the danger sensing and alarming method illustrated in FIG. 24.

FIG. 25 illustrates an example where an execution state of an application in execution is controlled by the mobile terminal 100 according to the present invention according to the danger sensing and alarming method illustrated in FIG. 24.

The mobile terminal 100 senses an opened manhole that is a front side dangerous situation by analyzing a front side image captured while a user is on the go. The controller 180 may determine the manhole as a front side dangerous situation having the highest degree of danger 'danger degree 1' within a range of 5 meters past 10 meters before the manhole, and may determine the degree of danger of the manhole as 'danger degree 2' which is lower than danger degree 1 if the user goes away from the manhole by 5 meters or more.

At this time, the controller 180 may temporarily stop execution of the application in execution in the section of danger degree 1 with respect to the manhole and may then resume the stopped execution of the application when the user reaches the section of danger degree 2 with respect to the manhole.

Figure 26:
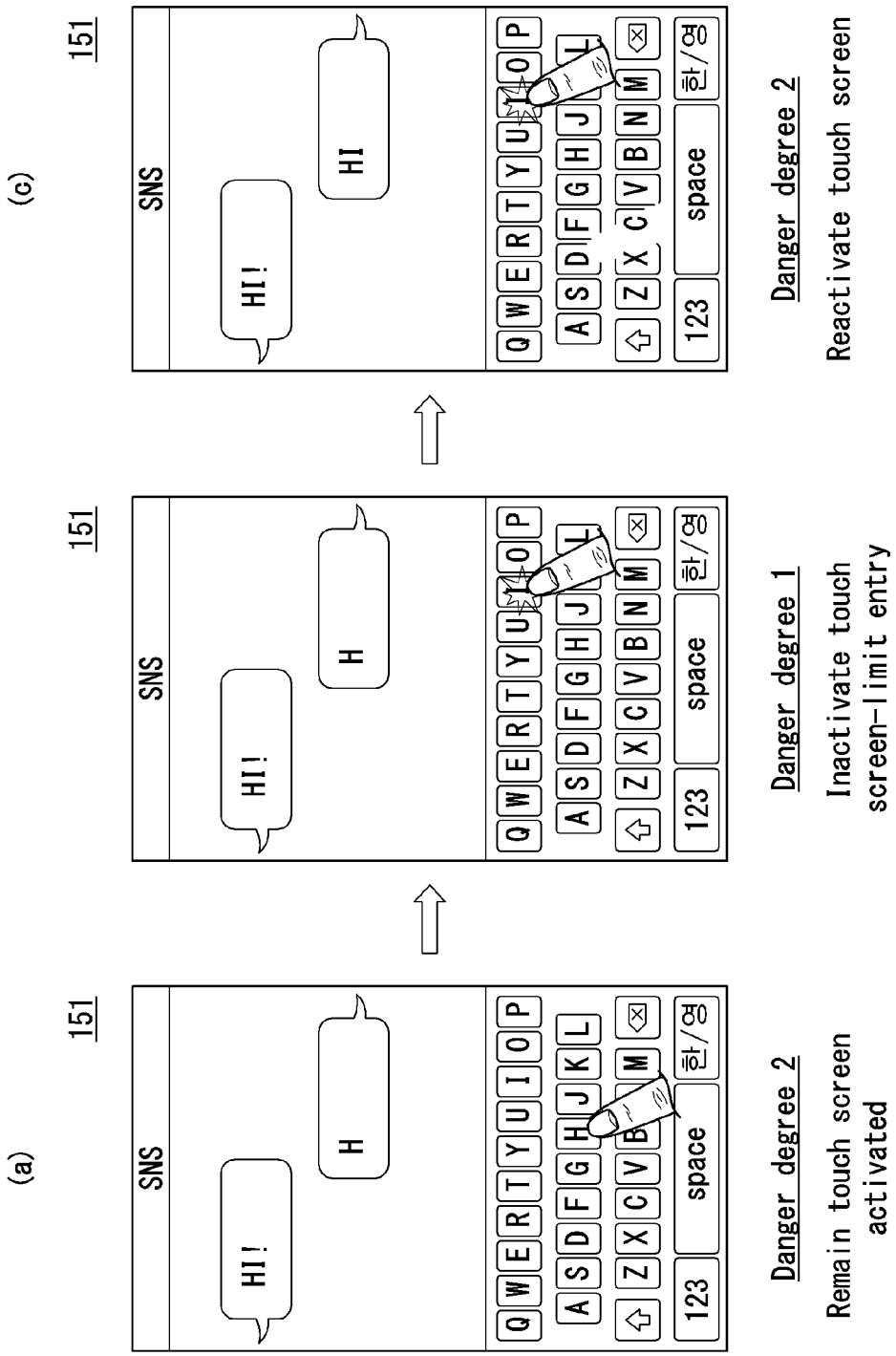
FIG. 26 illustrates an example where the input function of the A/V (Audio/Video) input unit in the mobile terminal according to the present invention is inactivated according to the danger sensing and alarming method illustrated in FIG. 23.

FIG. 26 illustrates an example where the input function of the A/V (Audio/Video) input unit 120 in the mobile terminal 100 according to the present invention is inactivated according to the danger sensing and alarming method illustrated in FIG. 23. FIG. 26(a) illustrates an example where in case the degree of danger of the front side dangerous situation is 'danger degree 2', the display unit 151 included in the A/V (Audio/Video) input unit 120 remains in an activated state, and a user inputs text through the display unit 151.

FIG. 26(b) illustrates an example where in case the degree of danger of the front side dangerous situation goes up to 'danger degree 1', the display unit 151 is inactivated, and thus, even when the user touches the display unit 151, no text input function is performed. That is, although the user touches a key 'I' on a virtual keyboard to enter the word "HI", the controller 180 does not perform a function of inputting 'I'. Then, the user recognizes that entry through the display unit 151 is blocked and there is a dangerous situation at a front side.

FIG. 26(c) illustrates an example where in case the degree of danger of the front side dangerous situation goes down back to 'danger degree 2', the display unit 151 is reactivated, and the user may perform a text entry function through the display unit 151. That is, in case the user touches the key 'I' to complete the word 'HI', the controller 180 performs a function of inputting 'I'.

That is, if the degree of danger of the front side dangerous situation is higher than a predetermined level, the mobile terminal 100 according to the present invention inactivates an entry function through the A/V (Audio/Video) input unit 120, and if the degree of danger of the front side dangerous situation becomes lower than the predetermined level, the mobile terminal 100 may put the entry function of the A/V (Audio/Video) input unit 120 back into activation.

Meanwhile, although not shown in the drawings, the controller 180 may control the activation state on the key pad and the microphone 122 included in the A/V (Audio/Video) input unit 120 in consideration of the degree of danger of the front side dangerous situation.

Figure 27:
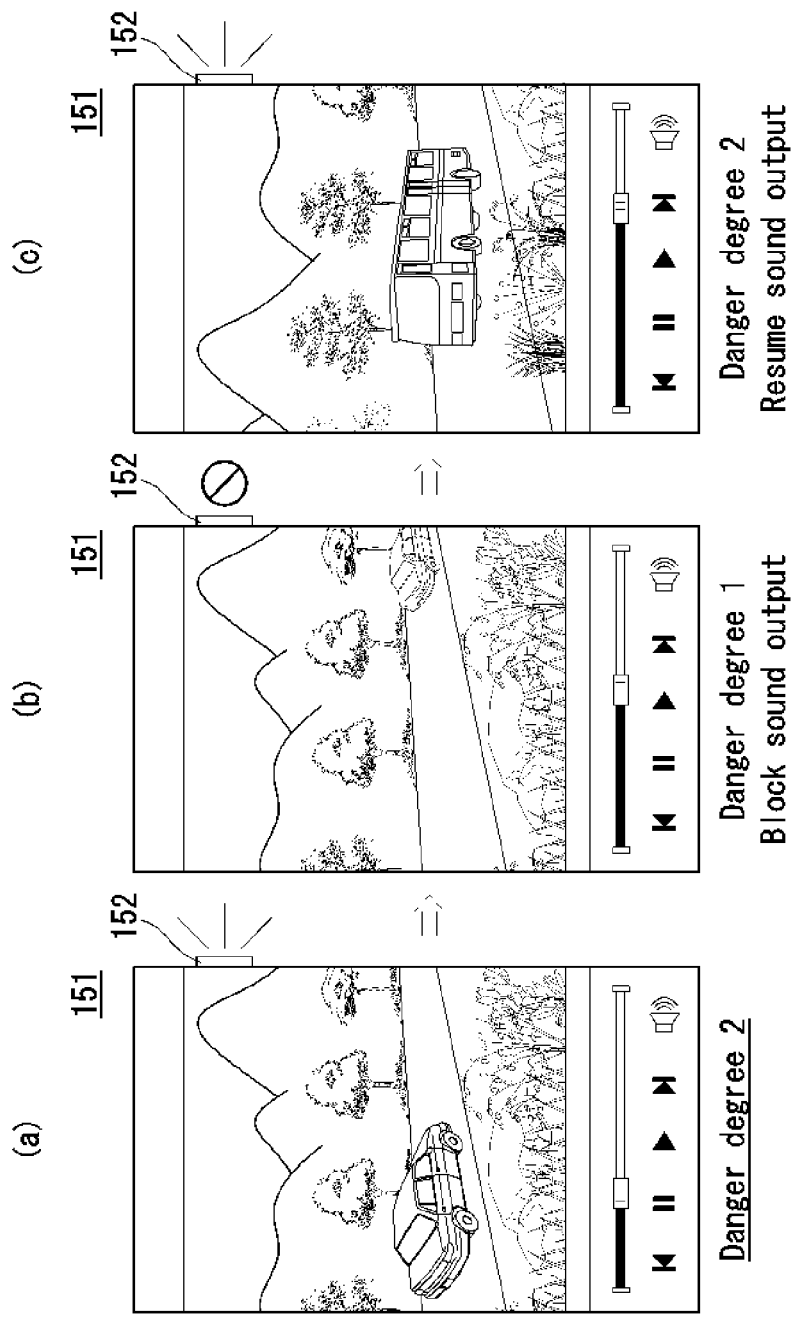
FIG. 27 illustrates an example where an output function of the output unit in the mobile terminal according to the present invention is controlled according to the danger sensing and alarming method illustrated in FIG. 23.

FIG. 27 illustrates an example where an output function of the output unit 150 in the mobile terminal 100 according to the present invention is controlled according to the danger sensing and alarming method illustrated in FIG. 23. FIG. 27(*a*) illustrates an example where in case the degree of danger of the front side dangerous situation is 'danger degree 2', the display unit 151 and the sound output unit 152 included in the output unit 150 both remain in an activated state. That is, in case a movie is played back, the image is output through the display unit 151 and the sound is output through the sound output unit 152.

FIG. 27(*b*) illustrates an example where in case the degree of danger of the front side dangerous situation goes up to 'danger degree 1', the image output function of the display unit 151 maintains the activation state, but the sound output function of the sound output unit 152 is inactivated. That is, the controller 180 outputs the image of the movie played back through the display unit 151 but not output the sound. Then, the user may recognize that there is a dangerous situation at the front side by noticing that the output of the sound is suddenly stopped.

FIG. 27(*c*) illustrates an example where in case the degree of danger of the front side dangerous situation goes down back to 'danger degree 2', the sound output unit 152 is reactivated, and a sound signal corresponding to the movie is output through the sound output unit 152.

Meanwhile, even when reflecting the degree of danger of the front side dangerous situation to limit the output function of the output unit 150, the controller 180 may not stop execution of the application in execution. Referring to FIG. 27, the image displayed on the display unit 151 is changed, and this represents that although the degree of danger increases, the execution of the movie replaying application is not stopped.

As described above in connection with FIG. 27, if the degree of danger of the front side dangerous situation is higher than a predetermined level, the mobile terminal 100 according to the present invention may inactivate at least one of the image output function and the sound output function, and if the degree of danger of the front side dangerous situation is lower than the predetermined level, the mobile terminal 100 may put the inactivated output function back into activation.

Meanwhile, although not shown in the drawings, in case the degree of danger of the front side dangerous situation is higher than the predetermined level, the controller 180 may temporarily lower a specific output function or change the output state rather than fully inactivating the specific output function, thereby sending a warning message to the user.

For example, in case the degree of danger of the front side dangerous situation is higher than the predetermined level, the controller 180 may lower the volume of a sound output through the sound output unit 152 to a predetermined level or may output a predetermined sound signal (e.g., alert sound). Further, if the degree of danger of the front side dangerous situation is higher than the predetermined level, the controller 180 may blur the image output through the display unit 151 or darken the screen, or may output a predetermined image signal (e.g., alert text).

Meanwhile, in case, in addition to the danger sensing and alarming method illustrated in FIG. 23, the degree of danger of the front side dangerous situation is higher than the predetermined level as described above, the mobile terminal 100 according to the present invention may send a warning message to the user by changing the screen display state of the display unit 151. At this time, what is changed of the screen state of the display unit 151 may be determined depending on the degree of danger of the dangerous situation.

Further, in addition to the danger sensing and alarming method illustrated in FIG. 23, the mobile terminal 100 according to the present invention may also perform the operations as described above, such as an operation of outputting a guiding message according to a standing angle of the mobile terminal 100, an operation of leading to a natural increase in the standing angle, and an operation of utilizing the data stored in the memory 160 according to a standing angle.

Each of the methods of displaying a front side image, sensing danger, and alarming, which are performed in the mobile terminal 100 according to the present invention may be implemented in the form of a program that may be executed through various computer means and may be recorded in a computer readable medium. The computer readable medium may include, alone or in combination, a program command, a data file, and a data structure. The program recorded in the medium may be designed or configured specifically for the present invention or may be known and used by those skilled in the art.

Examples of the computer readable recording medium include a hardware device specifically configured to store and conduct a program command, such as magnetic media including hard discs, floppy discs, and magnetic tapes, optical media including CD-ROMs and DVDs, magneto-optical media including floptical discs, and flash memories including ROMs and RAMs. Examples of the program include high-level language codes executable by a computer using an interpreter, as well as machine language codes, e.g., created by a compiler. The hardware devices may be configured to operate as one or more software modules to perform the operation according to the present invention, and vice versa.

Although the present invention has been described with reference to a limited number of embodiments and the drawings, the present invention is not limited to the embodiments, and it may be understood by those skilled in the art that various modifications or variations may be made to the present invention.

Thus, the scope of the present invention should not be limited to the above-described embodiments but should be rather defined by the appending claims and their equivalents.

What is claimed is:

1. A mobile terminal comprising:
a sensor sensing a user's movement;
an output unit including a display unit, wherein the display unit is configured to display an execution screen of an application in execution;
a rear camera, wherein the rear camera is located on the opposite side of the display unit; and
a controller configured to:
 determine whether the user is on the go via the sensor,
  cause the display unit to display an image captured via the rear camera when the user is on the go, wherein the image is displayed with the execution screen of the application,
  determine whether a dangerous situation is included in the captured image,
   determine a degree of danger of the sensed dangerous situation, and change a display state of the display unit when the dangerous situation is included in the captured image,
wherein if the degree of danger of the dangerous situation is higher than a predetermined level, the controller is configured to temporarily stop the application in execution, and if the degree of danger of the dangerous situation is lower than the predetermined level, the controller is configured to resume the execution of the application in execution.

2. The mobile terminal of claim 1, wherein the sensor is configured to further sense a standing angle of the mobile terminal with respect to a ground, and wherein the controller is configured to output a guiding message through the output unit if the sensed standing angle is smaller than a threshold angle, wherein the guiding message instructs the standing angle to be increased.

3. The mobile terminal of claim 1, wherein the sensor is configured to further sense a standing angle of the mobile terminal with respect to a ground, and wherein if the sensed standing angle is smaller than a threshold angle, the controller is configured to control the display unit so that the execution screen of the application is rotated frontward around a virtual horizontal axis of a lower end portion of the display unit.

4. The mobile terminal of claim 1, wherein the sensor is configured to further sense a standing angle of the mobile terminal with respect to a ground, and wherein if the sensed standing angle is smaller than a threshold angle, the controller is configured to refer to a captured front side image stored in a memory to sense a front side dangerous situation.

5. The mobile terminal of claim 1, wherein the sensor is configured to further sense a standing angle of the mobile terminal with respect to a ground, and wherein if the sensed standing angle is smaller than a threshold angle, the controller is configured to refer to map data previously stored in a memory to sense a dangerous situation.

6. The mobile terminal of claim 1, wherein when the dangerous situation is sensed, the controller is configured to send a warning message to the user by changing a display state of the captured image.

7. The mobile terminal of claim 6, wherein the controller is configured to display the captured image, with the captured image overlapping the execution screen of the application in execution, and wherein if the dangerous situation is sensed, the controller is configured to increase a degree of transparency of the execution screen of the application in execution and to decrease a degree of transparency of the captured image.

8. The mobile terminal of claim 6, wherein the controller is configured to change a display state of a screen of the display unit in consideration of the degree of danger of the sensed dangerous situation.

9. The mobile terminal of claim 8, wherein the controller is configured to change a degree of transparency of the captured image or to change the type of at least one of the separate alert sound and the separate alert image depending on the degree of danger of the sensed dangerous situation.

10. The mobile terminal of claim 6, wherein when the dangerous situation is sensed, the controller is configured to control the rear camera and the display unit so that the dangerous situation is greatly displayed in the captured image.

11. The mobile terminal of claim 6, wherein if the dangerous situation is sensed, the controller is configured to control the rear camera so that the sensed dangerous situation is focused.

12. The mobile terminal of claim 1, wherein if the dangerous situation is sensed, the controller is configured to output at least one of a separate alert sound and a separate alert image through the output unit.

13. The mobile terminal of claim 1, further comprising a front camera configured to capture the user's image while the user is walking, wherein the controller is configured to analyze the captured user's image and to control a sensing sensitivity of the dangerous situation based on the user's eyeing position.

14. A mobile phone comprising:
a sensor sensing a user's movement;
an output unit including a display unit configured to display an execution screen of an application in execution;
an input unit including a rear camera, wherein the rear camera is located on the opposite side of the display unit; and
a controller configured to:
determine whether the user is on the go via the sensor,
cause the rear camera to capture an image when the user is on the go,
determine whether a dangerous situation is included in the captured image,
determine a degree of danger of the dangerous situation, and
control at least one of an execution state of the application in execution, an activation state of the input unit, and an activation state of the output unit if the degree of danger of the dangerous situation is higher than a predetermined level,
wherein if the degree of danger of the dangerous situation is higher than the predetermined level, the controller is configured to temporarily stop the application in execution, and if the degree of danger of the dangerous situation is lower than the predetermined level, the controller is configured to resume the execution of the application in execution.

15. The mobile phone of claim 14, wherein if the degree of danger of the dangerous situation is higher than the predetermined level, the controller is configured to inactivate an input function through the input unit, and if the degree of danger of the dangerous situation is lower than the predetermined level, the controller is configured to reactivate the data input function through the input unit.

16. The mobile phone of claim 14, wherein if the degree of danger of the dangerous situation is higher than the predetermined level, the controller is configured to inactivate at least one of an image output function and a sound output function of the output unit, and if the degree of danger of the dangerous situation is lower than the predetermined level, the controller is configured to reactivate the inactivated at least one output function.

17. The mobile phone of claim 14, wherein the controller is configured to further display the captured image on the display unit, wherein if the degree of danger of the dangerous situation is higher than a predetermined level, the controller is configured to change a display state of the display unit to send a warning message to the user, and wherein what is changed of the display state of the display unit is determined depending on the degree of danger of the dangerous situation.

18. The mobile phone of claim 14, wherein the sensor is configured to further sense a standing angle of the mobile phone with respect to a ground, and wherein the controller is configured to output a guiding message through the output unit if the sensed standing angle is smaller than a threshold angle, wherein the guiding message instructs the standing angle to be increased.

19. The mobile phone of claim 14, wherein the sensor is configured to further sense a standing angle of the mobile phone with respect to a ground, and wherein if the sensed standing angle is smaller than a threshold angle, the controller is configured to control the display unit so that the execution screen of the application is rotated frontward around a virtual horizontal axis of a lower end portion of the display unit.

20. The mobile phone of claim 14, wherein the sensor is configured to further sense a standing angle of the mobile phone with respect to a ground, and wherein if the sensed standing angle is smaller than a threshold angle, the controller is configured to refer to a captured front side image stored in a memory or map data previously stored in the memory to sense a front side dangerous situation.

* * * * *